United States Patent
Thomas

(10) Patent No.: US 10,315,609 B2
(45) Date of Patent: Jun. 11, 2019

(54) AIRBAG ASSEMBLY CONFIGURED TO BE DISPOSED ON MULTIPLE SIDES OF AN OCCUPANT OF A VEHICLE AND CONFIGURED TO ALLOW THE HEAD OF THE OCCUPANT TO ROTATE FORWARD WITH THE TORSO OF THE OCCUPANT

(71) Applicant: GM GLOBAL TECHNOLOGY OPERATIONS LLC, Detroit, MI (US)

(72) Inventor: Scott D. Thomas, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/784,468

(22) Filed: Oct. 16, 2017

(65) Prior Publication Data

US 2019/0111883 A1    Apr. 18, 2019

(51) Int. Cl.
| | |
|---|---|
| *B60R 21/00* | (2006.01) |
| *B60R 21/213* | (2011.01) |
| *B60R 21/232* | (2011.01) |
| *B60R 21/235* | (2006.01) |
| *B60R 21/261* | (2011.01) |
| *B60R 21/2338* | (2011.01) |

(52) U.S. Cl.
CPC .......... *B60R 21/232* (2013.01); *B60R 21/213* (2013.01); *B60R 21/2338* (2013.01); *B60R 21/261* (2013.01); *B60R 21/235* (2013.01); *B60R 2021/0048* (2013.01); *B60R 2021/23382* (2013.01); *B60R 2021/23386* (2013.01); *B60R 2021/23514* (2013.01); *B60R 2021/23576* (2013.01); *B60R 2021/2612* (2013.01)

(58) Field of Classification Search
CPC .. B60R 21/232; B60R 21/213; B60R 21/2338
See application file for complete search history.

(56) References Cited

U.S. PATENT DOCUMENTS 5,470,103 A * 11/1995 Vaillancourt ......... B60R 21/214
                                                    280/730.1
7,195,276 B2 * 3/2007 Higuchi ................ B60R 21/231
                                                    280/729

(Continued)

OTHER PUBLICATIONS

U.S. Appl. No. 15/599,123, filed May 18, 2017, Mihm.

(Continued)

*Primary Examiner* — Faye M Fleming

(57) ABSTRACT

An airbag assembly of the present disclosure includes a forward cushion portion, a left side cushion portion, and a right side cushion portion. The forward cushion portion is configured to be disposed in front of an occupant of a vehicle. The left and right side cushion portions are connected to and in fluid communication with the forward cushion portion, are configured to be disposed on left and right sides of the occupant, respectively, and are configured to be mounted to a roof of the vehicle. The left side cushion portion, the right side cushion portion, and the forward cushion portion define at least one opening disposed above a lower region of the forward cushion portion and between the left and right side cushion portions. The at least one opening allows at least a portion of the lower region to move forward relative to the left and right side cushion portions.

20 Claims, 18 Drawing Sheets

(56) References Cited

U.S. PATENT DOCUMENTS

| | | | |
|---|---|---|---|
| 7,762,579 B2* | 7/2010 | Garner | B60R 21/08 |
| | | | 280/730.2 |
| 9,321,423 B2* | 4/2016 | Jaradi | B60R 21/015 |
| 9,327,669 B2* | 5/2016 | Jaradi | B60R 21/08 |
| 9,428,135 B1 | 8/2016 | Thomas et al. | |
| 9,446,735 B1* | 9/2016 | Jayasuriya | B60R 21/232 |
| 9,610,915 B2 | 4/2017 | Specht et al. | |
| 2007/0045999 A1* | 3/2007 | Saberan | B60R 21/213 |
| | | | 280/730.2 |
| 2017/0158158 A1 | 6/2017 | Thomas | |

OTHER PUBLICATIONS

U.S. Appl. No. 15/825,665, filed Nov. 29, 2017, Thomas et al.
U.S. Appl. No. 15/825,800, filed Nov. 29, 2017, Thomas et al.
U.S. Appl. No. 15/825,921, filed Nov. 29, 2017, Thomas.

* cited by examiner

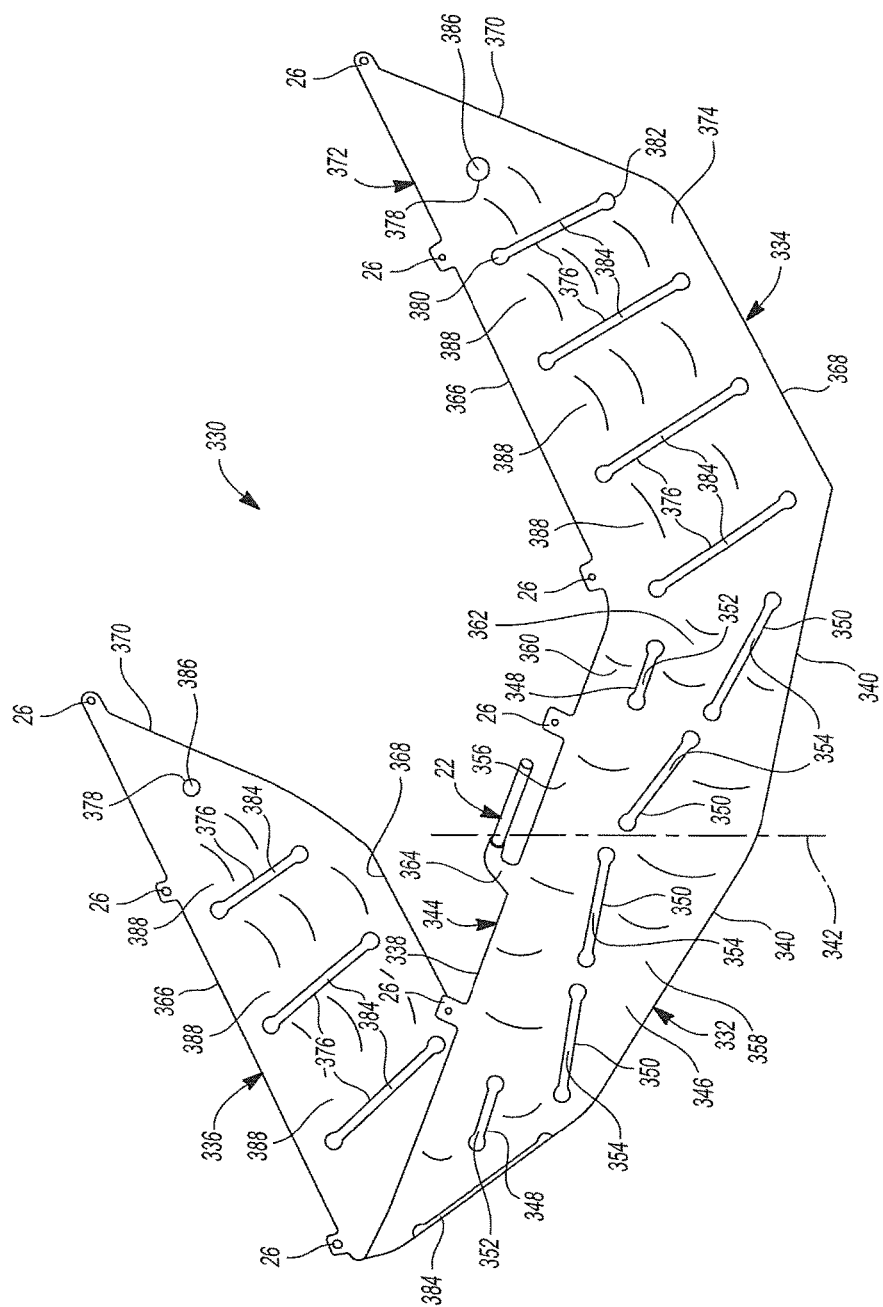

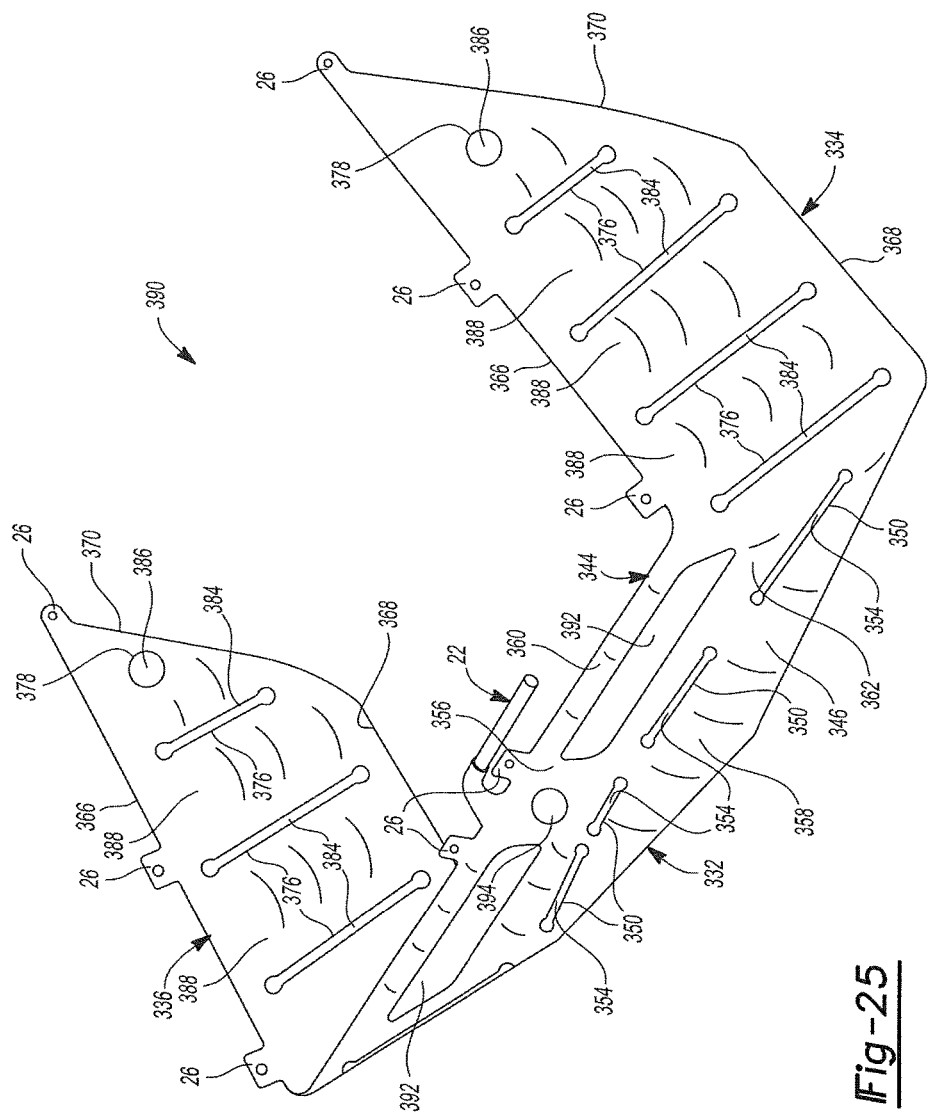

AIRBAG ASSEMBLY CONFIGURED TO BE DISPOSED ON MULTIPLE SIDES OF AN OCCUPANT OF A VEHICLE AND CONFIGURED TO ALLOW THE HEAD OF THE OCCUPANT TO ROTATE FORWARD WITH THE TORSO OF THE OCCUPANT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to airbag assemblies configured to be disposed on multiple sides of an occupant of a vehicle and configured to allow the head of the occupant to rotate forward with the torso of the occupant.

Airbag assemblies typically include an airbag cushion and an inflator that is operable to inflate the airbag cushion. The inflator includes a tube having a closed end containing a gas source and an open end opposite the closed end and positioned within the airbag cushion. The gas source typically includes an electric igniter and at least one of an explosive charge such as solid propellant and a stored gas charge stored under high pressure. The electric igniter ignites the solid propellant and/or releases the stored gas in response to an electronic control signal, which produces a gas that inflates the airbag cushion.

Airbag assemblies are typically mounted in a dashboard of a vehicle, in a seat of a vehicle, and/or in a steering wheel of a vehicle. However, some airbag assemblies are mounted to a roof of a vehicle and deploy in a downward direction from the vehicle roof. Such airbag assemblies are commonly referred to as roof-mounted airbag systems.

SUMMARY

An airbag assembly according to the present disclosure includes a forward cushion portion, a left side cushion portion, and a right side cushion portion. The forward cushion portion is configured to be disposed in front of an occupant of a vehicle and includes a lower region. The left side cushion portion is connected to and in fluid communication with the forward cushion portion, is configured to be disposed on a left side of the occupant, and is configured to be mounted to a roof of the vehicle. The right side cushion portion is connected to and in fluid communication with the forward cushion portion, is configured to be disposed on a right side of the occupant, and is configured to be mounted to the vehicle roof. The left side cushion portion, the right side cushion portion, and the forward cushion portion define at least one opening disposed above the lower region of the forward cushion portion and between the left and right side cushion portions. The at least one opening allows at least a portion of the lower region to move forward relative to the left and right side cushion portions.

In one example, the forward cushion portion further includes a left upper region configured to be mounted to the vehicle roof and a right upper region configured to be mounted to the vehicle roof, and the lower region of the forward cushion portion is disposed below and in fluid communication with the left and right upper regions.

In one example, each of the left and right upper regions of the forward cushion portion includes a first fill tube configured to provide fluid communication between an inflator and one of the left and right side cushion portions, and a tether connecting the first fill tube to the lower region of the forward cushion portion. The tethers of the left and right upper regions divide the at least one opening into a first opening, a second opening, and a third opening. The first opening is disposed between the tethers. The second opening separates the tether of the left upper region from the left side cushion portion. The third opening separates the tether of the right upper region from the right side cushion portion.

In one example, the lower region includes a lower portion that is attached to the left and right side cushion portions and an upper portion that is separated from the left and right side cushion portions by the second and third openings. The lower portion of the lower region has a first cross-sectional area in a first vertical plane adjacent to the left and right side cushion portions and a second cross-sectional area in a second vertical plane at or near a midpoint of the forward cushion portion in a direction extending between the left and right side cushion portions. The second cross-sectional area is greater than the first cross-sectional area.

In one example, the tether is a second fill tube that places the first fill tube in fluid communication with the lower region of the forward cushion portion.

In one example, the tether has a length that is greater than a distance between the first fill tube and the lower region of the forward cushion portion.

In one example, the airbag assembly further includes a rigid fill tube configured to deliver gas from an inflator to each of the forward cushion portion, the left side cushion portion, and the right side cushion portion. The rigid fill tube includes a straight segment extending through the forward cushion portion and a pair of curved segments that each extends from the straight segment to one of the left and right side cushion portions through an angle greater than 45 degrees.

In one example, the airbag assembly further includes at least one of (i) a left rear cushion portion in fluid communication with the left side cushion portion, configured to be disposed rearward of the occupant, and configured to be mounted to the vehicle roof, and (ii) a right rear cushion portion in fluid communication with the right side cushion portion, configured to be disposed rearward of the occupant, and configured to be mounted to the vehicle roof.

In one example, the at least one of the left and right rear cushion portions is configured to be disposed adjacent to one side of a head restraint for the occupant without being disposed behind the head restraint.

In one example, the at least one of the left and right rear cushion portions is configured to be disposed behind a head restraint for the occupant.

Another airbag assembly according to the present disclosure includes a forward cushion portion and a first side cushion portion. The forward cushion portion is configured to be disposed in front of an occupant of a vehicle. The first side cushion portion is in fluid communication with the forward cushion portion, is configured to be disposed on a first side of the occupant, and is configured to be mounted to a roof of the vehicle. The first side cushion portion has an upper horizontal edge, a lower horizontal edge, a front edge, and a rear edge. The first side cushion portion includes an inner panel portion, an outer panel portion, and a plurality of seams joining the inner and outer panel portions to one another and defining a plurality of elongated inflated regions. The plurality of seams are oriented at a nonzero oblique angle with respect to the upper horizontal edge.

In one example, the first side cushion portion further includes a first inflated region disposed rearward of the plurality of elongated inflated regions, each of the plurality of elongated inflated regions having a first width between the inner and outer panel portions, the first inflated region having a second width between the inner and outer panel portions that is greater than the first width.

In one example, the forward cushion portion includes an inner panel portion, an outer panel portion, and at least one seam joining the inner and outer panel portions of the forward cushion portion to one another and defining at least one boundary between at least two lobes of the forward cushion portion.

In one example, the forward cushion portion further includes a panel attached to upper and lower edges of the forward cushion portion and extending over the at least two lobes to provide a flat surface configured to face the occupant.

In one example, the forward cushion portion further includes a tether disposed within at least one of the at least two lobes, joining the inner and outer panel portions to one another, and flattening the inner panel portion.

Another airbag assembly according to the present disclosure includes a side cushion portion configured to be disposed on one side of an occupant of a vehicle, and a mounting tab connected to the side cushion portion and configured to be attached to a roof of the vehicle. The side cushion portion includes an inner panel portion, an outer panel portion, and a first seam joining the inner and outer panel portions to one another and defining a boundary between a forward inflated region of the side cushion portion and a rearward inflated region of the side cushion portion. The forward inflated region is configured to be disposed at least partially forward of the occupant and the rearward inflated region is configured to be disposed at least partially rearward of the occupant. The forward inflated region has a first width between the inner and outer panel portions, and the rearward inflated region has a second width between the inner and outer panel portions that is greater than the first width.

In one example, the second width is at least two times greater than the first width.

In one example, the rearward inflated region is aligned with at least one of a seatback for the occupant and a head restraint for the occupant in a fore-aft direction of the vehicle.

In one example, the rearward inflated region forms at least one of multiple air-filled chambers disposed above a seatback for the occupant and adjacent to one side of a head restraint for the occupant.

In one example, the airbag assembly further includes a rear cushion portion in fluid communication with the side cushion portion. The rear cushion portion includes an inner panel portion, an outer panel portion, second and third seams joining the inner and outer panel portions to one another, and an end that is joined to the side cushion portion at the first seam. The first and second seams define a first one of the air-filled chambers therebetween. The second and third seams define a second one of the air-filled chambers therebetween. The third seam and the end of the rear cushion portion define a third one of the air-filled chambers therebetween.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 23 is a perspective view of another example of an airbag assembly according to the present disclosure, with an airbag cushion of the airbag assembly shown inflated;

FIG. 25 is a perspective view of another example of an airbag assembly according to the present disclosure, with an airbag cushion of the airbag assembly shown inflated;

In the drawings, reference numbers may be reused to identify similar and/or identical elements.

DETAILED DESCRIPTION

Figure 1:
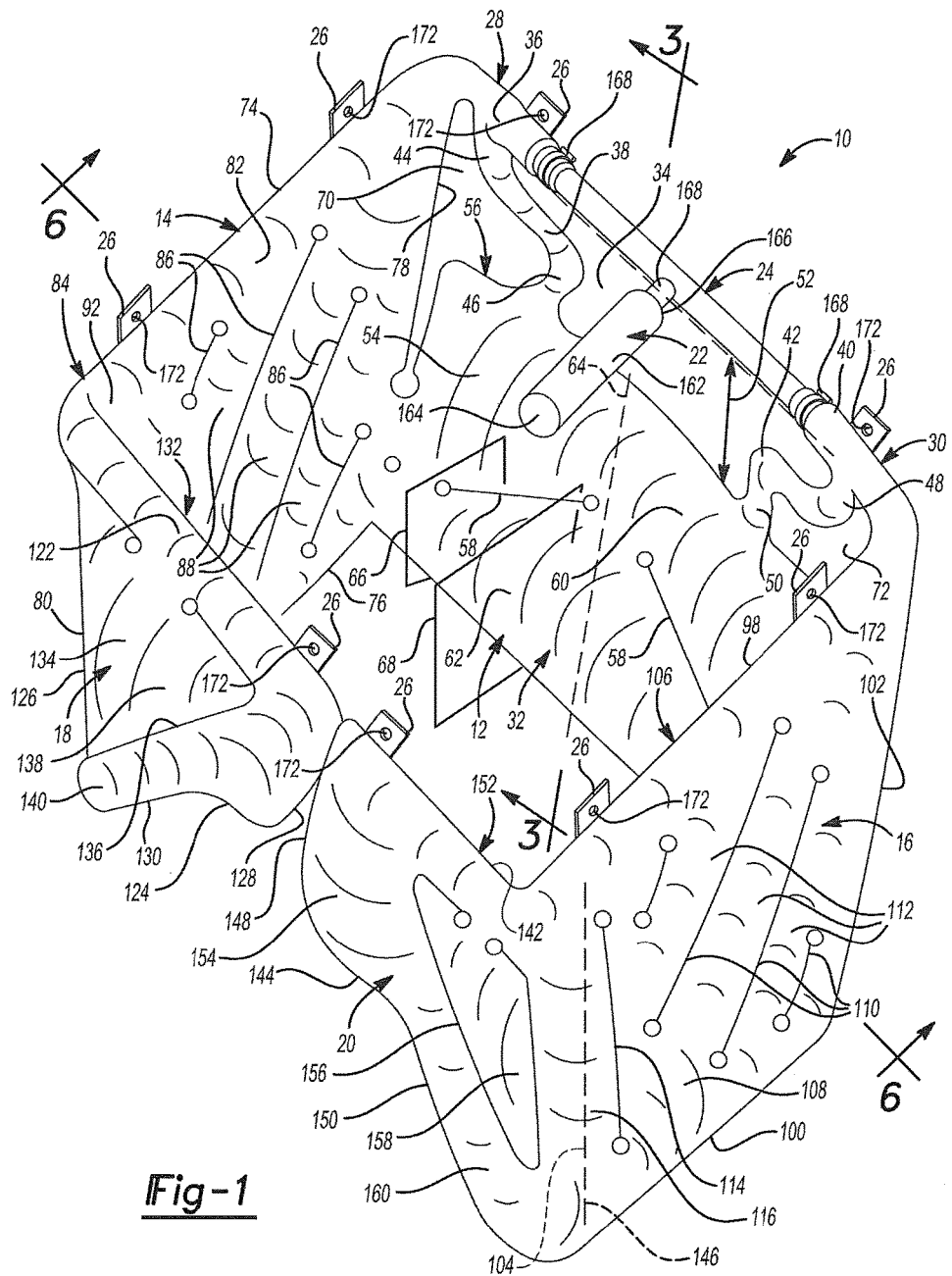
FIG. 1 is a perspective view of an example of an airbag assembly according to the present disclosure, with an airbag cushion of the airbag assembly shown inflated.

An airbag cushion of a roof-mounted airbag system is typically only disposed beside an occupant of a vehicle when the airbag cushion is deployed (or inflated). In contrast, an airbag cushion according to the present disclosure surrounds at least three sides of an occupant when the airbag cushion is deployed. In one example, the airbag cushion includes a forward cushion portion, a left side cushion portion, and a right side cushion portion. When the airbag cushion is inflated, the forward cushion portion is disposed in front of the occupant, and the left and right cushion portions are disposed on the left and right sides of the occupant, respectively.

In addition, the left and right cushion portions have seams defining angled inflated regions that pull the lower end of the forward cushion portion in a rearward direction. Further, the forward cushion portion has one or more openings that allow an upper portion of the forward cushion portion to rotate and translate relative to a lower portion of the forward cushion portion. In turn, the upper portion of the forward cushion portion rotates in the same direction as the head of the occupant when the head impacts the upper portion. As a result, the head of the occupant is allowed to rotate with the torso of the occupant when the head engages the upper portion of the forward cushion portion, which reduces the forces and moment on the neck of the occupant.

Referring now to FIGS. 1-6, an airbag assembly 10 includes a forward cushion portion 12, a left side cushion portion 14, a right side cushion portion 16, a left rear cushion portion 18, a right rear cushion portion 20, an inflator 22, a rigid fill tube 24, and a plurality of mounting tabs 26 that attached the airbag assembly 10 to a structural component of a vehicle. The cushion portions 12, 14, 16, 18, and 20 can be made from a flexible fabric material, such as a fabric fiber material construction, with limited expandability when pressurized. This material can be coated with one or more gas impermeable layers or materials to reduce gas leakage through the fabric or seams. The forward cushion portion 12 is configured to be disposed in front of an occupant 27 of the vehicle. The forward cushion portion 12 includes a left upper region 28, a right upper region 30, and a lower region 32 disposed below the left and right upper regions 28 and 30. The left upper region 28, the right upper region 30, and the lower region 32 define a first opening 34 therebetween. The first opening 34 is configured to be directly in front of and above the occupant 27. The first opening 34 may have a width (i.e., a minimum cross-vehicle or left-to-right dimension) that is approximately equal to the width of a seatback 115 for the occupant 27.

The left upper region 28 includes a fabric fill tube 36 that provides fluid communication between the inflator 22 and the left side cushion portion 14, and a tether 38 connecting the fabric fill tube 36 to the lower region 32. Similarly, the right upper region 30 includes a fabric fill tube 40 that provides fluid communication between the inflator 22 and the right side cushion portion 16, and a tether 42 connecting the fabric fill tube 40 to the lower region 32. In the example shown, the tether 38 is a fill tube that places the fabric fill tube 36 in fluid communication with the lower region 32, and the tether 42 is a fill tube that places the fabric fill tube 40 in fluid communication with the lower region 32. However, in various implementations, the tethers 38, 42 may be strips of uninflated fabric (e.g., single layer fabric strips).

The tether 38 has an upper end 44 connected to the fabric fill tube 36, a lower end 46 connected to the lower region 32, and a first length extending from the upper end 44 to the lower end 46. Similarly, the tether 42 has an upper end 48 connected to the fabric fill tube 40, a lower end 50 connected to the lower region 32, and a second length extending from the upper end 48 to the lower end 50. Each of the first and second lengths is greater than a distance 52 between (i) the fabric fill tubes 36, 40 and (ii) the lower region 32, which provides slack in the tethers 38, 42. This slack can be achieved by oversizing the tether length (i.e., making the first and second lengths greater than the distance 52), placing one or more bends in the tethers 38, 42, and/or laterally offsetting (i.e., offsetting in a cross-vehicle or left-right direction) the tether attachment points relative to one another. An example of this last option may include laterally offsetting an upper attachment point of the tether 38 relative to a lower attachment point of the tether 38 and laterally offsetting an upper attachment point of the tether 42 relative to a lower attachment point of the tether 42.

The lower region 32 includes an inner panel portion 54, an outer panel portion 56, and a pair of seams 58 joining the inner and outer panel portions 54 and 56 to one another. The seams 58 define a boundary between an upper portion 60 of the lower region 32 and a lower portion 62 of the lower region 32. Each of the seams 58 is formed by stitching the inner and outer panel portions 54 and 56 to one another, by fibers of the inner and outer panel portions 54 and 56 woven together, and/or by a tether (e.g., a fabric strip) extending between and woven or otherwise attached to the inner and outer panel portions 54 and 56. If the seams 58 are formed by stitching or woven material, the inner and outer panel portions 54 and 56 may contact one another at the seams 58. In this regard, the stitching or woven material may be referred to as a zero-length tether since the length of the stitching or woven material extending between the inner and outer panel portions 54 and 56 at the seams 58 may be approximately zero.

The seams 58 are angled upward in a direction from the left and right side cushion portions 14 and 16 to a centerline 64 of the forward cushion portion 12. The centerline 64 extends through the midpoint of the forward cushion portion 12 in a direction extending between the left and right side cushion portions 14 and 16. Since the seams 58 are angled upward toward the centerline 64, the cross-sectional area of the lower portion 62 of the lower region 32 is greater at the centerline 64 than at locations adjacent to the left and right side cushion portions 14 and 16. For example, the lower portion 62 of the lower region 32 has a first cross-sectional area in a first vertical plane 66 adjacent to the left and right side cushion portions 14 and 16 and a second cross-sectional area in a second vertical plane 68 at or near the centerline 64. The second cross-sectional area is greater than the first cross-sectional area. Due to this difference in the cross-sectional areas of the lower portion 62 of the lower region 32, the lower portion 62 is stiffer at the centerline 64 than at locations adjacent to the left and right side cushion portions 14 and 16. As a result, when the occupant 27 applies a force to the lower portion 62 of the lower region 32, the lower portion 62 of the lower region 32 can resist bending and transmit the occupant force to the lower portion 62 to the left and right side cushion portions 14 and 16. In turn, the left and right side cushion portions 14 and 16 transmit the occupant force to the overhead structure of the vehicle.

The forward cushion portion 12 and the left side cushion portion 14 define a second opening 70 that separates the left upper region 28 of the forward cushion portion 12 from the left side cushion portion 14. Similarly, the forward cushion portion 12 and the right side cushion portion 16 define a third opening 72 that separates the right upper region 30 of the forward cushion portion 12 from the right side cushion portion 16. The second opening 70 also separates part of the upper portion 60 of the lower region 32 from the left side cushion portion 14, and the third opening 72 also separates part of the upper portion 60 of the lower region 32 from the right side cushion portion 16. The remainder of the upper portion 60 of the lower region 32, and the lower portion 62 of the lower region 32, are attached to the left and right side cushion portions 14 and 16.

Thus, the lower region 32 of the forward cushion portion 12, the left side cushion portion 14, and the right side cushion portion 16 define an opening that is disposed above the lower region 32 and between the left and right side cushion portions 14 and 16. In addition, the tethers 38, 42 divide this opening into the first, second and third openings 34, 70, and 72. Further, the forward cushion portion 12 does not extend above a majority of the first opening 34.

The left side cushion portion 14 is configured to be disposed on the left side of the occupant 27 and may at least partially cover a window opening of the vehicle. The left side cushion portion 14 is in fluid communication with the forward cushion portion 12 through the fabric fill tube 36 of the forward cushion portion 12 and through the attachment with the lower region 32 of the forward cushion portion 12. The left side cushion portion 14 has an upper horizontal edge 74, a lower horizontal edge 76, a front edge 78, and a rear edge 80. Each of the front and rear edges 78 and 80 may be vertical or angled. The left side cushion portion 14 includes an inner panel portion 82, and outer panel portion 84, and a plurality of seams 86 joining the inner and outer panel portions 82 and 84 to one another and defining a plurality of elongated inflated regions 88. Each of the elongated inflated regions 88 has a tubular shape. The seams 86 and the elongated inflated regions 88 are oriented at a nonzero oblique angle with respect to each of the upper horizontal edge 74, the lower horizontal edge 76, the front edge 78, and the rear edge 80. In one example, each of the seams 86 and the elongated inflated regions 88 is oriented at an angle between 30 degrees and 60 degrees (e.g., 45 degrees) with respect to the upper horizontal edge 74 and the lower horizontal edge 76.

The left side cushion portion 14 further includes a vertical seam 90 (FIGS. 3-5) defining an inflated region 92 disposed rearward of the plurality of elongated inflated regions 88. In this regard, the plurality of elongated inflated regions 88 may be collectively or individually referred to as a forward inflated region, and the inflated region 92 may be referred to as a rearward inflated region. As best shown in FIG. 6, each of the elongated inflated regions 88 has a first width 94 between the inner and outer panel portions 82 and 84, and the inflated region 92 has a second width 96 between the inner and outer panel portions 82 and 84. The second width 96 is greater than the first width 94. In one example, the second width 96 is at least two times greater than the first width 94.

Each of the seams 86, 90 is formed by stitching the inner and outer panel portions 82 and 84 to one another, by fibers of the inner and outer panel portions 82 and 84 woven together, and/or by a tether (e.g., a fabric strip) extending between and woven or otherwise attached to the inner and outer panel portions 82 and 84. If the seams 86, 90 are formed by stitching or woven material, the inner and outer panel portions 82 and 84 may contact one another at the seams 86, 90. In this regard, the stitching or woven material may be referred to as a zero-length tether since the length of the stitching or woven material extending between the inner and outer panel portions 82 and 84 at the seams 86, 90 may be approximately zero.

Referring still to FIGS. 1-6, the right side cushion portion 16 is configured to be disposed on the right side of the occupant 27 and may at least partially cover a window opening of the vehicle. The right side cushion portion 16 is in fluid communication with the forward cushion portion 12 through the fabric fill tube 40 of the forward cushion portion 12 and through the attachment with the lower region 32 of the forward cushion portion 12. The right side cushion portion 16 has an upper horizontal edge 98, a lower horizontal edge 100, a front edge 102, and a rear edge 104. Each of the front and rear edges 102 and 104 may be vertical or angled. The right side cushion portion 16 includes an inner panel portion 106, an outer panel portion 108, and a plurality of seams 110 joining the inner and outer panel portions 106 and 108 to one another and defining a plurality of elongated inflated regions 112. Each of the elongated inflated regions 112 has a tubular shape. The seams 110 and the elongated inflated regions 112 are oriented at a nonzero oblique angle with respect to each of the upper horizontal edge 98, the lower horizontal edge 100, the front edge 102, and the rear edge 104. In one example, each of the seams 110 and the elongated inflated regions 112 is oriented at an angle between 30 degrees and 60 degrees (e.g., 45 degrees) with respect to the upper horizontal edge 98 and the lower horizontal edge 100.

Figure 4:
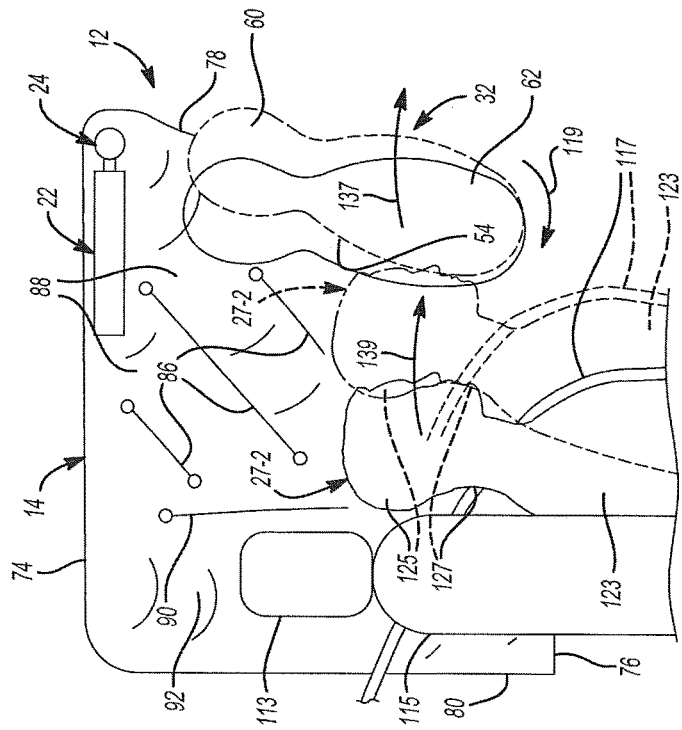
FIGS. 3-5 are cross-sectional views of the airbag assembly of FIG. 1 taken along a line 3-3 shown in FIG. 1, and a side view of a seatback and occupants of various heights moving away from the seatback and engaging the airbag assembly.
Figure 3:
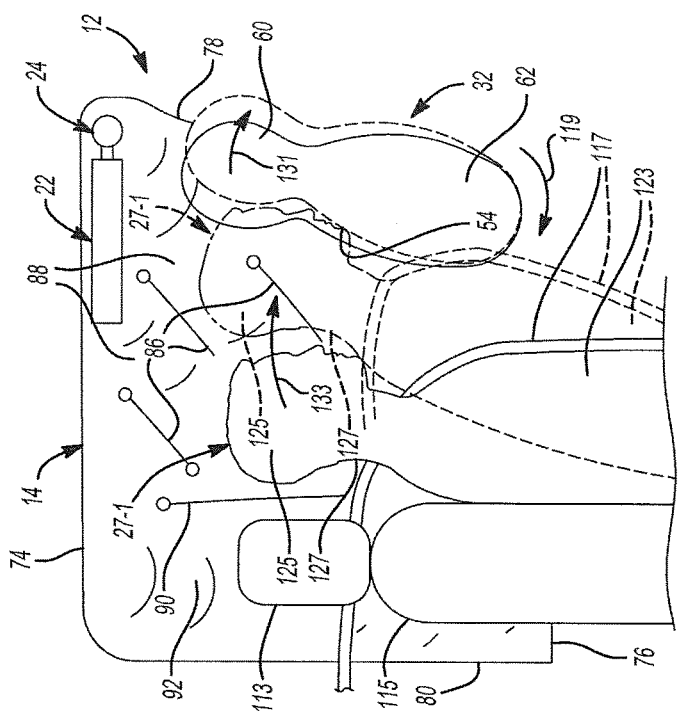
Figure 5:
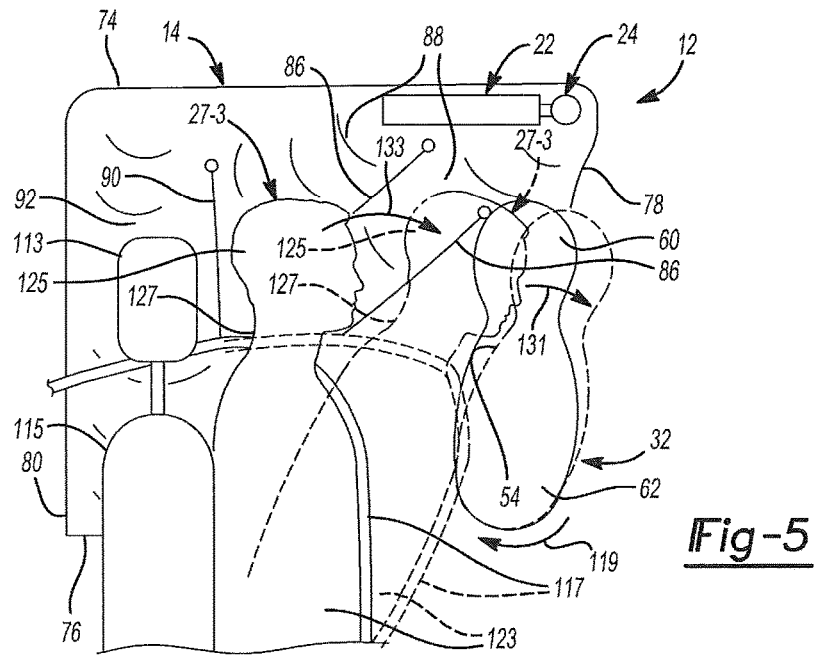
Figure 6:
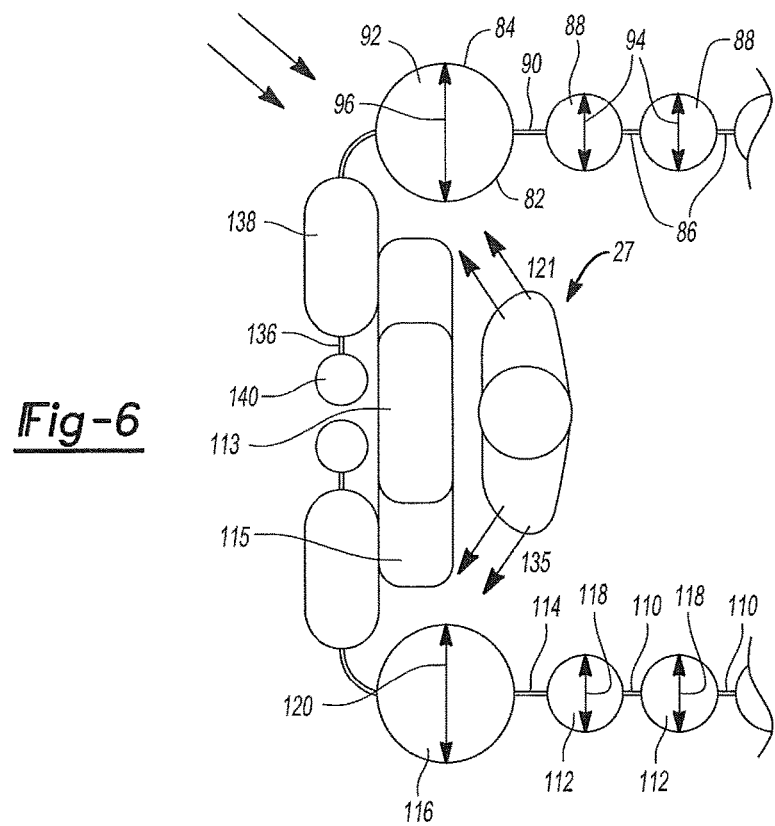
FIG. 6 is a cross-sectional view of a portion of the airbag assembly of FIG. 1 taken along a line 6-6 shown in FIG. 1, and a top view of a seat and an occupant.

With specific reference to FIGS. 3-5, a portion of the airbag assembly 10 is shown along with a head restraint 113, the seatback 115, a seatbelt 117, and occupants 27 of various heights moving away from the seatback 115 and engaging the airbag assembly 10. The occupants 27 including first occupant 27-1 (FIG. 3) having an average height, a second occupant 27-2 (FIG. 4) having a shorter height, and a third occupant 27-3 (FIG. 5) having a taller height. Each occupant 27 is represented using a solid line when the occupant 27 is resting against the seatback 115, such as may occur during normal driving conditions. Each occupant 27 is represented using a phantom line when the occupant 27 is moving forward and engaging the airbag assembly 10, such as may occur during a vehicle impact.

The angle of the seams 86, 110 and the elongated inflated regions 88, 112 causes the lower portion 62 of the forward cushion portion 12 to move rearward toward the occupant 27. In turn, the lower region 32 of the forward cushion portion 12 rotates in a direction 119 so that the inner panel portion 54 of the forward cushion portion 12 is generally closer to the occupant 27. The first opening 34 in the forward cushion portion 12 reduces the stiffness of the connection between the fabric fill tubes 36, 40 and the lower region 32 of the forward cushion portion 12. Similarly, the second and third openings 70 and 72 reduce the stiffness of the connections between the forward cushion portion 12 and the left and right side cushion portions 14 and 16, respectively. Thus, the first, second, and third openings 34, 70, and 72 allow the upper portion 60 of the lower region 32 of the forward cushion portion 12 to rotate in a direction 131, which is the same as a direction 133 in which a head 125 of each occupant 27 rotates. In addition, the slack in the tethers 38, 42 allow the upper portion 60 of the lower region 32 of the forward cushion portion 12 to rotate further in the direction 131 than would be possible without the slack in the tethers 38, 42. Further, the first, second, and third openings 34, 70, and 72 and the slack in the tethers 38, 42 allow the lower region 32 of the forward cushion portion 12 to move forward in a direction 137, which is the same as a direction 139 in which the head 125 moves.

Since the upper portion 60 of the lower region 32 of the forward cushion portion 12 is not attached to the left and right side cushion portions 14 and 16, the upper portion 60 can rotate when the head 125 of the occupant 27 contacts the upper portion 60. This is shown in FIGS. 3-5 where the initial position of the lower region 32 is shown using a solid line, the position of the lower region 32 after the occupant 27 contacts the lower region 32 is shown using a dashed line, and the motion of the lower region 32 is shown using arrows. This allows the head 125 of each occupant 27 to rotate forward into the forward cushion portion 12 so that neck flexion can occur and/or so that the torso 123 and the head 125 can remain generally aligned with each other, which reduces the forces and moment on a neck 127 of each occupant 27. In addition, while the torso 123 of the shorter occupant 27-2 may not contact the lower region 32 of the forward cushion portion 12, the movement of the lower portion 62 of the lower region 32 toward the occupant 27 during inflation reduces the distance between the head 125 of the occupant 27-2 and the lower portion 62. The lower portion 62 of the lower region 32 is also further away from the overhead structure of the vehicle, which makes the lower portion 62 somewhat compliant. As a result, the impact force between the head 125 and the lower portion 62 of the lower region 32 is reduced, which reduces the forces and moment on the neck 127 of the occupant 27-2.

Referring again to FIGS. 1-6, the right side cushion portion 16 further includes a vertical seam 114 defining an inflated region 116 disposed rearward of the plurality of elongated inflated regions 112. In this regard, the plurality of elongated inflated regions 112 may be collectively or individually referred to as a forward inflated region, and the inflated region 116 may be referred to as a rearward inflated region. As best shown in FIG. 6, each of the elongated inflated regions 112 has a third width 118 between the inner and outer panel portions 106 and 108, and the inflated region 116 has a fourth width 120 between the inner and outer panel portions 106 and 108. The fourth width 120 is greater than the third width 118. In one example, the fourth width 120 is at least two times greater than the third width 118. In addition, the third width 118 of the elongated inflated regions 112 may be equal to the first width 94 of the elongated inflated regions 88, and the fourth width 120 of the inflated region 116 may be equal to the second width 96 of the inflated region 92.

Each of the seams 110, 114 is formed by stitching the inner and outer panel portions 106 and 108 to one another, by fibers of the inner and outer panel portions 106 and 108 woven together, and/or by a tether (e.g., a fabric strip) extending between and woven or otherwise attached to the inner and outer panel portions 106 and 108. If the seams 110, 114 are formed by stitching or woven material, the inner and outer panel portions 106 and 108 may contact one another at the seams 110, 114. In this regard, the stitching or woven material may be referred to as a zero-length tether since the length of the stitching or woven material extending between the inner and outer panel portions 106 and 108 at the seams 110, 114 may be approximately zero.

As shown in FIG. 6 and discussed above, the inflated regions 92, 116 may have a greater width than the elongated inflated regions 88, 112. In addition, the inflated regions 92, 116 may be disposed adjacent to the head restraint 113 and on opposite sides of the head restraint 113. Thus, the inflated region 92, 116 may provide cushioning and/or restraint for the head 125 of the occupant 27 when the occupant 27 moves in a direction 121 or 135, such as may occur during a vehicle impact.

In FIG. 6, the inflated regions 92, 116 are disposed on opposite sides of the seatback 115 and are spaced apart from the seatback 115. In addition, a significant portion (e.g., one-half) of each of the inflated regions 92, 116 is disposed forward of the seatback 115. In another configuration shown in FIG. 7, the inflated regions 92, 116 are disposed on opposite sides of the seatback 115, are in contact with the seatback 115, and are aligned with the head restraint 113 and the seatback 115 in a fore-aft direction 129 of the vehicle. In another configuration shown in FIG. 8, the inflated regions 92, 116 are disposed above the seatback 115, are in contact with opposite sides of the head restraint 113, and are aligned with the head restraint 113 and the seatback 115 in the fore-aft direction 129.

Referring again to FIGS. 1-6, the left and right rear cushion portions 18 and 20 are configured to be disposed rearward of the occupant 27. The left rear cushion portion 18 is attached to and in fluid communication with the left side cushion portion 14. The left rear cushion portion 18 projects from the left side cushion portion 14 toward the right side cushion portion 16. The left rear cushion portion 18 has an upper horizontal edge 122, a lower horizontal edge 124, an outer vertical edge 126, an inner vertical edge 128, and an angled edge 130 that extends from the outer vertical edge 126 to the inner vertical edge 128. The upper horizontal edge 122, the lower horizontal edge 124, the outer vertical edge 126, the inner vertical edge 128, and the angled edge 130 collectively form the outer perimeter of the left rear cushion portion 18.

The left rear cushion portion 18 includes an inner panel portion 132, an outer panel portion 134, and a seam 136 joining the inner and outer panel portions 132 and 134 to one another. The seam 136 is generally parallel to and offset inward from the outer perimeter of the left rear cushion portion 18. The seam 136 defines a boundary between an inner inflated region 138 of the left rear cushion portion 18 and an outer inflated region 140 of the left rear cushion portion 18. In addition, the seam 136 cooperates with the vertical seam 90 of the left side cushion portion 14 to define the inflated region 92. The gas path to inflate the inner inflated region 138 can be located on any seam edge of the inner inflated region 138.

The right rear cushion portion 20 is attached to and in fluid communication with the right side cushion portion 16. The right rear cushion portion 20 projects from the right side cushion portion 16 toward the left side cushion portion 14. The right rear cushion portion 20 has an upper horizontal edge 142, a lower horizontal edge 144, an outer vertical edge 146, an inner vertical edge 148, and an angled edge 150 that extends from the outer vertical edge 146 to the inner vertical edge 148. The upper horizontal edge 142, the lower horizontal edge 144, the outer vertical edge 146, the inner vertical edge 148, and the angled edge 150 collectively form the outer perimeter of the right rear cushion portion 20.

The right rear cushion portion 20 includes an inner panel portion 152, an outer panel portion 154, and a seam 156 joining the inner and outer panel portions 152 and 154 to one another. The seam 156 is generally parallel to and offset inward from the outer perimeter of the right rear cushion portion 20. The seam 156 defines a boundary between an inner inflated region 158 of the right rear cushion portion 20 and an outer inflated region 160 of the right rear cushion portion 20. In addition, the seam 156 cooperates with the vertical seam 114 of the right side cushion portion 16 to define the inflated region 116. The inflated region 116 includes a part of the outer panel portion 154 disposed to the right of the seam 156. The gas path to inflate the inner inflated region 158 can be located on any seam edge of the inner inflated region 158.

Figure 9:
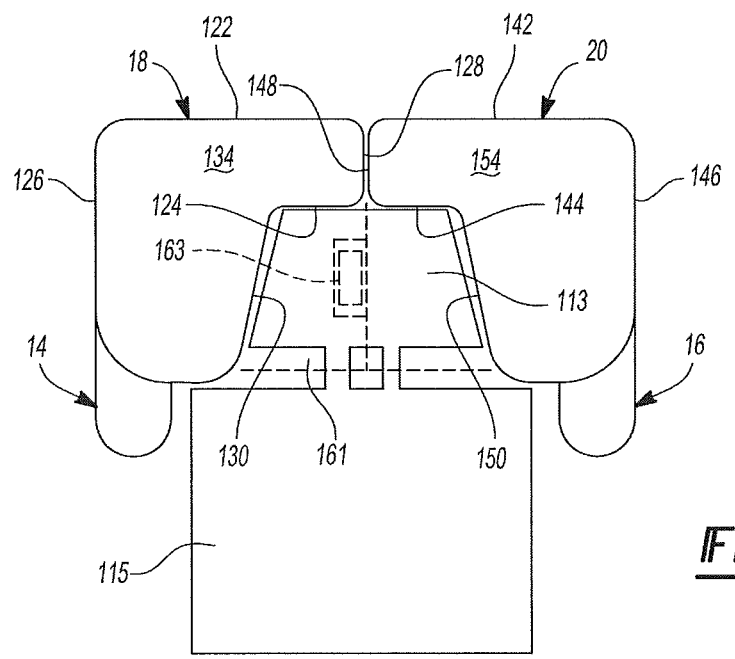
FIG. 9 is a rear view of the airbag assembly of FIG. 1.
Figure 10:
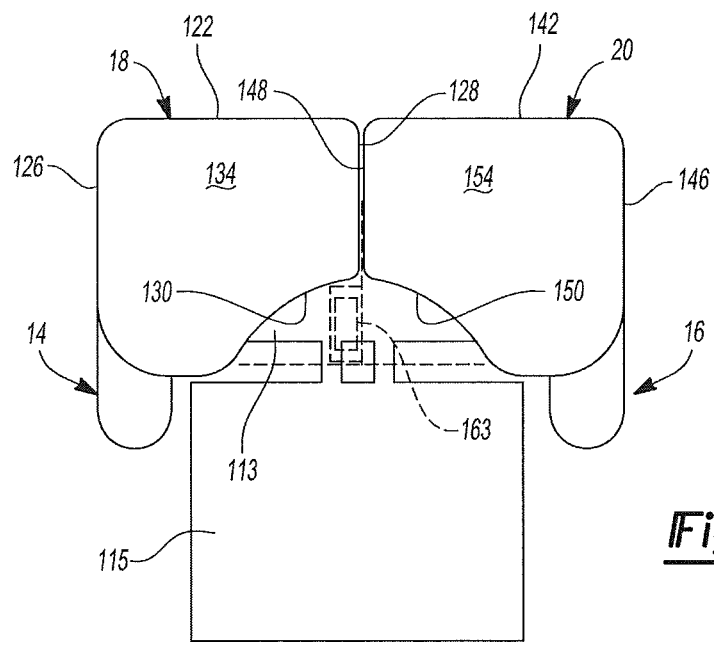
FIG. 10 is a rear view similar to the view shown in FIG. 9 and illustrating another example of airbag assembly according to the present disclosure.

Referring now to FIG. 9, the lower horizontal edges 124, 144 and the angled edges 130, 150 of the left and right rear cushion portions 18 and 20 collectively define an opening 161 that extends around the perimeter of the head restraint 113. Thus, each of the left and right rear cushion portions 18 and 20 is disposed above and to one side of the head restraint 113 without being disposed directly behind the head restraint 113. In other examples shown in FIG. 10 and represented in phantom lines in FIG. 2, the inner vertical edges 128, 148 extend further downward, and therefore each of the left and right rear cushion portions 18 and 20 is disposed directly behind the head restraint 113. In either example, the left and right rear cushion portions 18 and 20 may be completely separated from one another or connected (e.g., sewn) to one another. In addition, the left and right side cushion portions 14 and 16 may extend further downward than the forward cushion portion 12 and/or the left and right rearward cushion portions 18 and 20 as shown. In one example, shown in phantom in FIGS. 9 and 10, the inner vertical edges 128, 148 extend even further downward than the solid line representation of FIG. 10 such that the left and right rearward cushion portions 18 and 20 cover the entire backside of the head restraint 113. In addition, the left and right rear cushion portions 18 and 20 are connected to one another by stitching 163 arranged in a rectangular pattern.

Referring again to FIGS. 1-6, the inflator 22 is configured to inflate the forward cushion portion 12, the left side cushion portion 14, the right side cushion portion 16, the left rear cushion portion 18, and the right rear cushion portion 20. The inflator 22 sends gas to the forward cushion portion 12, the left side cushion portion 14, the right side cushion portion 16, the left rear cushion portion 18, and the right rear cushion portion 20 through the rigid fill tube 24. The inflator 22 includes a cylindrical body 162 having a closed end 164 and an open end 166 with a gas outlet nozzle (not shown) that is configured to connect to the rigid fill tube 24. In the example shown, the open end 166 of the inflator 22 is connected to the rigid fill tube 24 using a clamp 168 and/or a threaded joint (not shown). The cylindrical body 162 of the inflator 22 can be made from a metal such as steel.

The inflator 22 may be a pyrotechnic inflator, a stored gas inflator, or a hybrid inflator. In all cases, the cylindrical body 162 of the inflator 22 may house an electric igniter and an explosive charge such as a solid propellant. The electric igniter ignites the solid propellant in response to an electronic control signal, which produces a gas that inflates the cushion portions of the airbag assembly 10. If the inflator 22 is a hybrid inflator or a stored gas inflator, the cylindrical body 162 of the inflator 22 may also contain cold pressurized gas that cooperates with the gas released from combustion of the solid propellant to inflate the cushion portions of the airbag assembly 10.

The rigid fill tube 24 delivers gas from the inflator 22 to the forward cushion portion 12, the left side cushion portion 14, the right side cushion portion 16, the left rear cushion portion 18, and/or the right rear cushion portion 20. The rigid fill tube 24 extends into the fabric fill tubes 36, 40 of the forward cushion portion 12. The fabric fill tubes 36, 40 of the forward cushion portion 12 may be held onto the rigid fill tube 24 using multiple clamps 168. The rigid fill tube 24 can be made from a metal such as steel and can have one or more holes 170 (FIG. 2) for distributing gas to the cushion portions of the airbag assembly 10.

Figure 2:
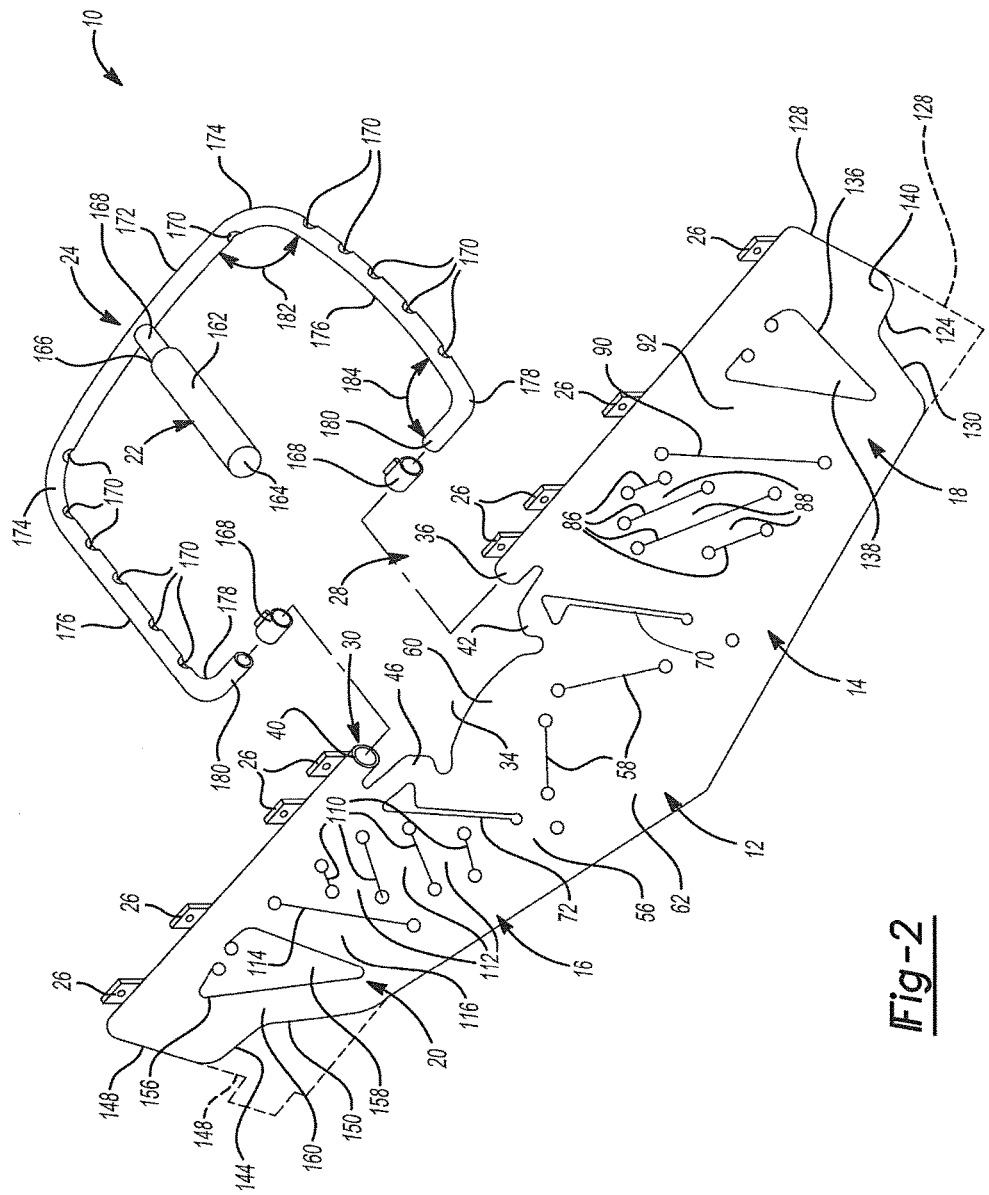
FIG. 2 is exploded perspective view of the airbag assembly of FIG. 1.

As best shown in FIG. 2, the rigid fill tube 24 may include a first straight segment 172, a pair of first curved segments 174, a pair of second straight segments 176, a pair of second curved segments 178, and a pair of third straight segments 180. The first straight segment 172 extends through the fabric fill tubes 36, 40 of the forward cushion portion 12. Each of the first curved segments 174 extends from the first straight segment 172 to one of the second straight segments 176 through a first angle 182. The first angle 182 may be greater than 45 degrees (e.g., 90 degrees).

Each of the second straight segments 176 extends through one of the left and right side cushion portions 14 or 16. Each of the second curved segments 178 extends from one of the second straight segments 176 to one of the third straight segments 180 through a second angle 184. The second angle 184 may be greater than 45 degrees (e.g., 90 degrees). Each of the third straight segments 180 extends partially through one of the left or right rear cushion portions 18 or 20.

In the example shown, the rigid fill tube 24 extends through the forward cushion portion 12, the left side cushion portion 14, the right side cushion portion 16, the left rear cushion portion 18, and the right rear cushion portion 20. During assembly, the fabric fill tubes 36, 40 are first slid over the third straight segments 180, then the second curved segments 178, then the second straight segments 176, then the first curved segments 174, and then the first straight segment 172. The clamps 168 may be slid onto the rigid fill tube 24 before the fabric fill tubes 36, 40 and then placed over the fabric fill tubes 36, 40 after the rigid fill tube 24 is positioned within the fabric fill tubes 36, 40. The clamps 168 may then be tightened to hold the fabric fill tubes 36, 40 in position on the first straight segment 172 of the rigid fill tube 24 as shown in FIG. 1.

In various implementations, the rigid fill tube 24 may not be as long as shown in FIG. 2 and thus may not extend through the forward cushion portion 12, the left side cushion portion 14, the right side cushion portion 16, the left rear cushion portion 18, and/or the right rear cushion portion 20. Additionally or alternatively, the rigid fill tube 24 may extend only partially through the forward cushion portion 12, the left side cushion portion 14, the right side cushion portion 16, the left rear cushion portion 18, and/or the right rear cushion portion 20. For example, the rigid fill tube 24 may extend through the fabric fill tubes 36, 40 of the forward cushion portion 12 and partially through the left and right side cushion portions 14 and 16 to a midpoint along the length (i.e. fore-aft dimension) thereof.

As yet another alternative, the inflator 22 may be located at a different position than the centerline 64 of the forward cushion portion 12. For example, the inflator 22 could be located on the left or right side of the forward cushion portion 12, or on the left or right side cushion portion 14 or 16. In addition, two inflators 22 could be used with, for example, one of the inflators 22 attached to the left side cushion portion 14 and one of the inflators 22 attached to the right side cushion portion 16. This two-inflator configuration would avoid the need for the rigid fill tube 24 to laterally span the forward cushion portion 12, and would enable omitting the left and right upper regions 28 and 30 from the forward cushion portion 12. It is also possible to have a rigid or fabric fill tube that enters the left and right cushion portions 14 and 16 from their respective rear ends with an inflator located at a position between the left and right cushion portions 14, 16. This would effectively move the laterally-extending portion of the fill tube from the front of the airbag assembly 10 to the rear of the airbag assembly 10.

The mounting tabs 26 can be made from a flexible fabric material and can be formed integral with the cushion portions of the airbag assembly 10 or formed separate from and attached to the cushion portions of the airbag assembly 10. Each of the mounting tabs 26 has a rectangular shape and defines a hole 172 configured to receive a fastener for mounting the airbag assembly 10 to a roof of the vehicle. In the example shown in FIGS. 1-6, the airbag assembly 10 includes two of the mounting tabs 26 on each of the forward cushion portion 12 and the left and right side cushion portions 14 and 16, and one of the mounting tabs 26 on each of the left and right rear cushion portions 20 and 22. However, the number of the mounting tabs 26 included in the airbag assembly 10 may be less than or greater than the number shown in FIGS. 1-6 and/or the mounting tabs 26 may be positioned differently than shown in FIG. 1-6.

Figure 11:
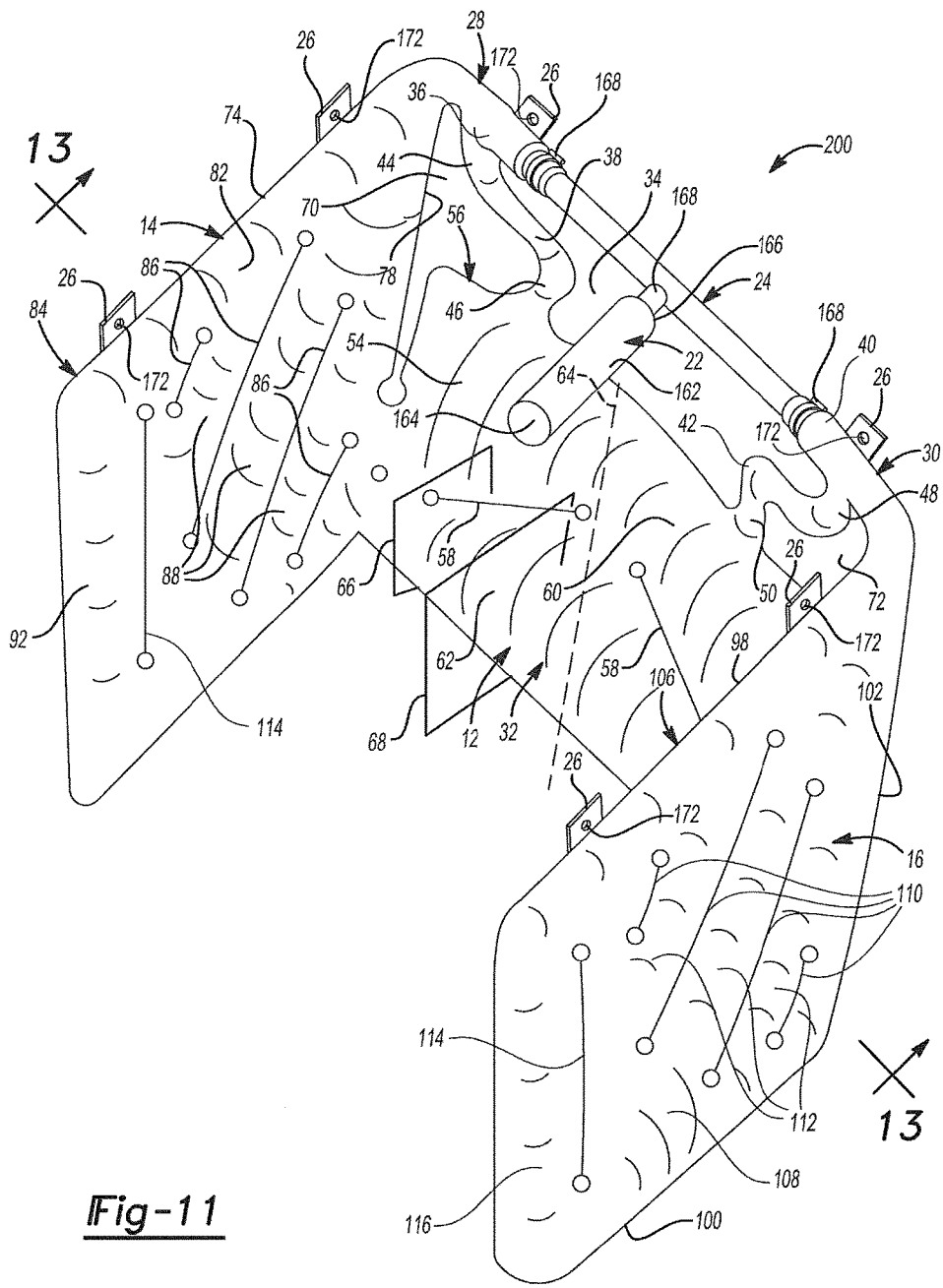
FIG. 11 is a perspective view of another example of an airbag assembly according to the present disclosure, with an airbag cushion of the airbag assembly shown inflated.
Figure 12:
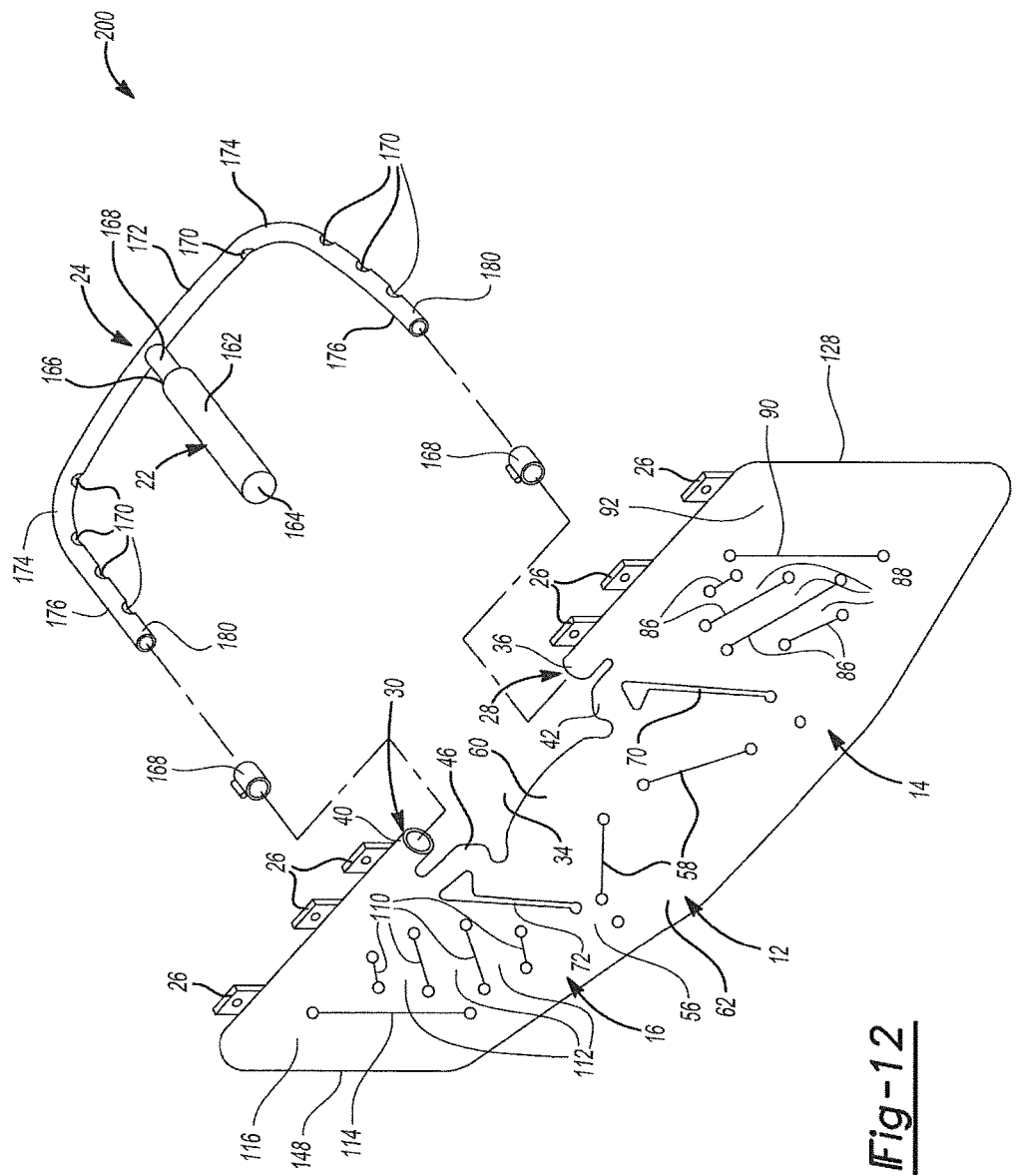
FIG. 12 is an exploded perspective view of the airbag assembly of FIG. 11.
Figure 13:
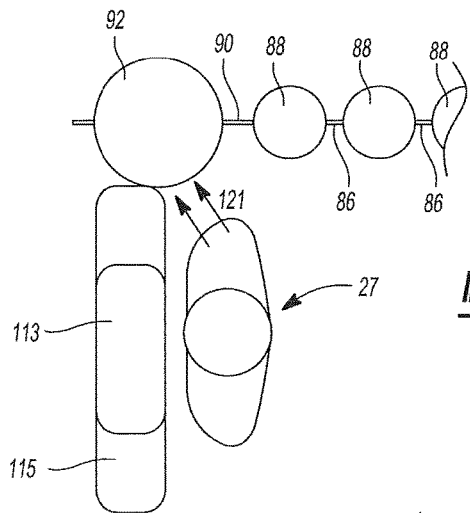
FIG. 13 is a cross-sectional view of a portion of the airbag assembly of FIG. 11 taken along a line 13-13 shown in FIG. 11, and a top view of a seat and an occupant.

Referring now to FIGS. 11-13, an airbag assembly 200 is similar to the airbag assembly 10 except that the airbag assembly 200 does not include the left and right rear cushion portions 18 and 20. In addition, as shown in FIG. 12, the rigid fill tube 24 does not include the second curved segments 178 or the third straight segments 180. Further, the second straight segments 176 of the airbag assembly 200 are shorter than the second straight segments 176 of the airbag assembly 10. To this end, the second straight segments 176 of the airbag assembly 200 extend only partially through the left and right side cushion portions 14 and 16 to a midpoint along the length (i.e. fore-aft dimension) thereof.

Figure 7:
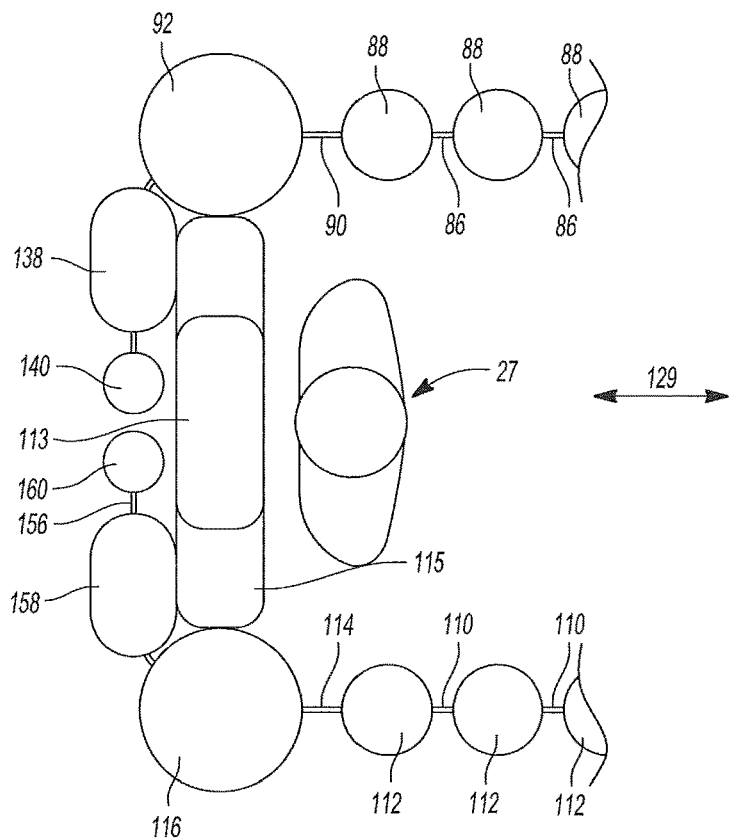
FIGS. 7 and 8 are views similar to the views shown in FIG. 6 and illustrating other examples of an airbag assembly according to the present disclosure.
Figure 8:
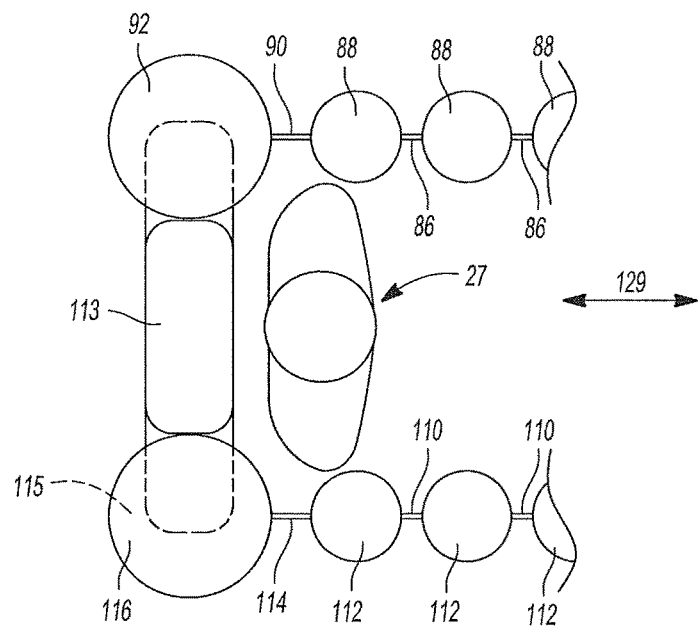

As with the airbag assembly 10, the inflated portions 92, 116 of the airbag assembly 200 are disposed on opposite sides of the seatback 115, and a significant portion (e.g., one-half) of each of the inflated portions 92, 116 is disposed forward of the seatback 115. However, as shown in FIG. 6 and discussed above, the inflated portions 92, 116 of the airbag assembly 10 are spaced apart from the seatback 115. In contrast, as shown in FIG. 13, the inflated portions 92, 116 of the airbag assembly 200 are in contact with the seatback 115 (i.e., are disposed closer to the occupant 27). In other configurations, the inflated portions 92, 116 of the airbag assembly 200 may be positioned as shown in FIG. 7 or 8.

Other variations of the airbag assemblies 10, 200 are within the scope of the present disclosure. For example, the airbag assembly 200 may not include one or both of the left and right side cushion portions 14 and 16. In another example, the inflator 22 may be connected to one of the left and right side cushion portions 14 and 16, and the airbag assembly 200 may not include the forward cushion portion 12 or the other one of the left and right side cushion portions 14 and 16.

Figure 14:
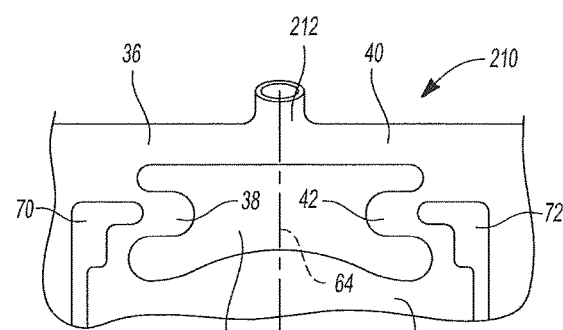
FIG. 14 is a rear view of an example of a forward cushion portion of another example of an airbag assembly according to the present disclosure.

Referring now to FIG. 14, a forward cushion portion 210 may be used in place of the forward cushion portion 12. The forward cushion portion 210 is similar to the forward cushion portion 12 except that the fabric fill tubes 36, 40 extend to the centerline 64 of the forward cushion portion 210 and are connected to one another. In addition, the forward cushion portion 210 includes an inlet tube 212 that projects upward from the junction between the fabric tubes 36, 40. The inlet tube 212 of the forward cushion portion 210 may be directly connected to the inflator 22. Thus, the design of the forward cushion portion 210 eliminates the need for the rigid fill tube 24.

Figure 15:
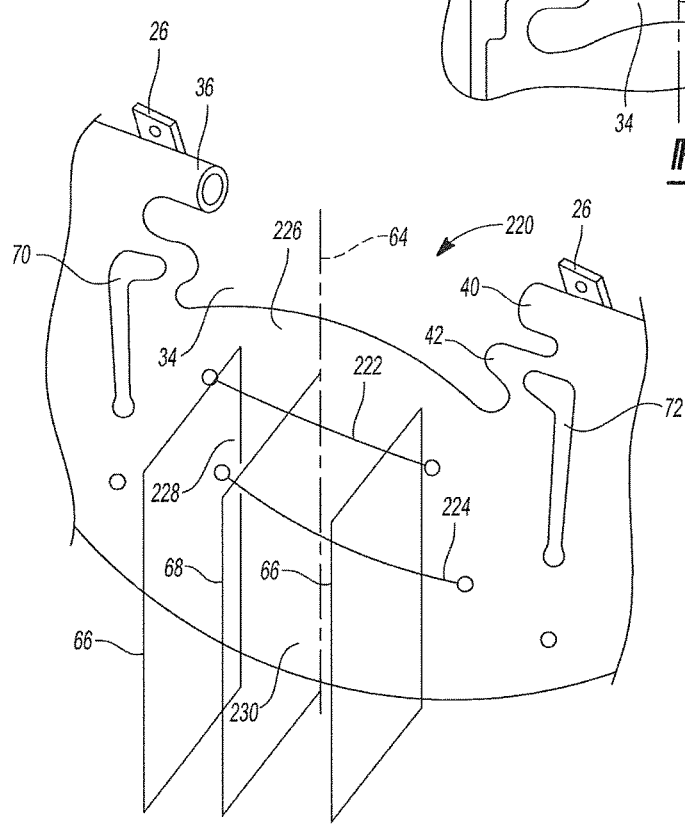
FIG. 15 is a perspective view of a forward cushion portion of another example of an airbag assembly according to the present disclosure.

Referring now to FIG. 15, a forward cushion portion 220 may be used in place of the forward cushion portion 12. The forward cushion portion 220 is similar to the forward cushion portion 12 except that the seams 58 are replaced with an upper seam 222 and a lower seam 224. The upper seam 222 defines a boundary between an upper portion 226 of the forward cushion portion 220 and a middle portion 228 of the forward cushion portion 220. The lower seam 224 defines a boundary between the middle portion 228 of the forward cushion portion 220 and a lower portion 230 of the forward cushion portion 220.

In contrast to the seams 58 of the forward cushion portion 12, the upper and lower seams 222 and 224 of the forward cushion portion 220 are not angled upward toward the centerline 64 of the forward cushion portion 220. Thus, the cross-sectional areas of the lower portion 230 of the forward cushion portion 220 in the first and second vertical planes 66 and 68 are approximately equal to one another. As a result, the lower portion 230 of the forward cushion portion 220 is less stiff at the centerline 64 relative to the lower portion 62 of the forward cushion portion 12.

Referring now to FIGS. 16-19, an airbag assembly 240 is similar to the airbag assembly 10 except that the airbag assembly 240 includes left and right rear cushion portions 242 and 244 in place of the left and right rear cushion portions 18 and 20, respectively. In addition, the rearward ends of the left and right rear cushion portions 242 and 244 are attached to a structural component of the vehicle such as the vehicle roof using first and second tethers 246 and 248, respectively. Further, the vertical seams 90, 114 in the left and right side cushion portions 14 and 16 are arranged in an oval shape instead of a straight line. The vertical seam 90 in the left side cushion portion 14 defines an outer perimeter of an uninflated region 250, and the vertical seam 114 in the right side cushion portion 16 defines an uninflated region 252.

The left rear cushion portion 242 includes an inner panel portion 254, an outer panel portion 256, an inner vertical seam 258, and an outer vertical seam 260. Each of the inner and outer vertical seams 258 and 260 joins the inner and outer panel portions to 254 and 256 to one another. The inner vertical seam 258 defines an outer perimeter of an inner uninflated region 262, and the outer vertical seam 260 defines an outer perimeter of an outer uninflated region 264. The outer perimeter of each of the inner and outer uninflated regions 262 and 264 has an oval shape.

Figure 19:
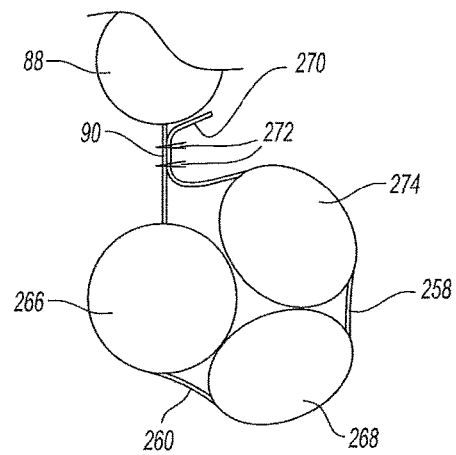
FIG. 19 is a cross-sectional view of the airbag assembly of FIG. 16 taken along a line 19-19 shown in FIG. 16.

The vertical seam 90 in the left side cushion portion 14 and the outer vertical seam 260 in the left rear cushion portion 242 define a first inflated region 266 (FIG. 16) therebetween. The inner and outer vertical seams 258 and 260 in the left rear cushion portion 242 define a second inflated region 268 therebetween. An end 270 of the left rear cushion portion 242 is sewn to the uninflated region 250 of the left side cushion portion 14 using stitches 272 (FIG. 19). The sewn end 270 of the left rear cushion portion 242 and the inner vertical seam 258 of the left rear cushion portion 242 define a third inflated region 274 therebetween.

Figure 18:
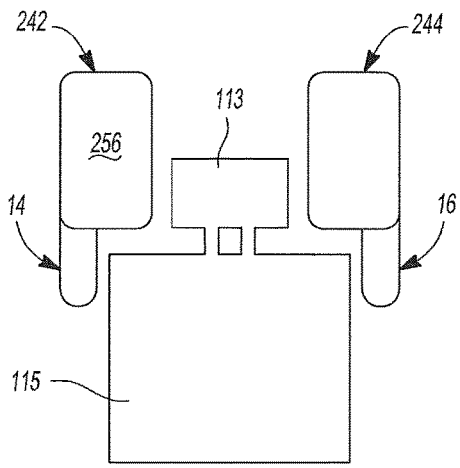
FIG. 18 is a rear view of the airbag assembly of FIG. 16 and a seat.

As best shown in FIG. 19, the first, second, and third inflated regions 266, 268, and 274 are distinct air-filled chambers that collectively form a large inflated structure that includes the left rear cushion portion 242. As shown in FIG. 18, the left rear cushion portion 242 is positioned adjacent to the left side of the head restraint 113 and above the seatback 115. Thus, the large inflated structure including the left rear cushion portion 242 provides cushioning and/or restraint for the head 125 of the occupant 27 on the left side of the head restraint 113.

The right rear cushion portion 244 includes an inner panel portion 276, an outer panel portion 278, an inner vertical seam 280, and an outer vertical seam 282. Each of the inner and outer vertical seams 280 and 282 joins the inner and outer panel portions to 276 and 278 to one another. The inner vertical seam 280 defines an outer perimeter of an inner uninflated region 284, and the outer vertical seam 282 defines an outer perimeter of an outer uninflated region 286. The outer perimeter of each of the inner and outer uninflated regions to 284 and 286 has an oval shape.

Figure 16:
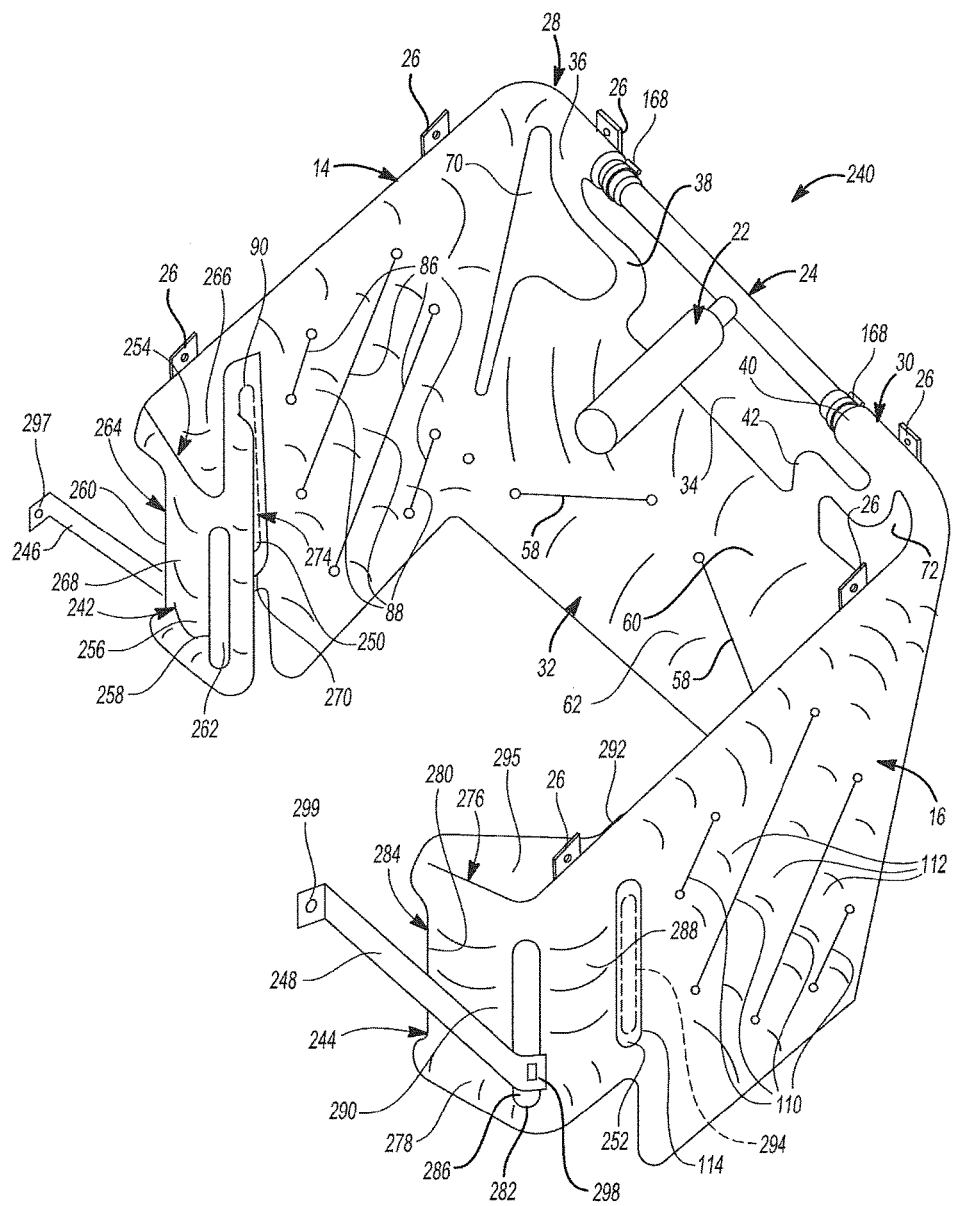
FIG. 16 is a perspective view of another airbag assembly according to the present disclosure, with an airbag cushion of the airbag assembly shown inflated.
Figure 17:
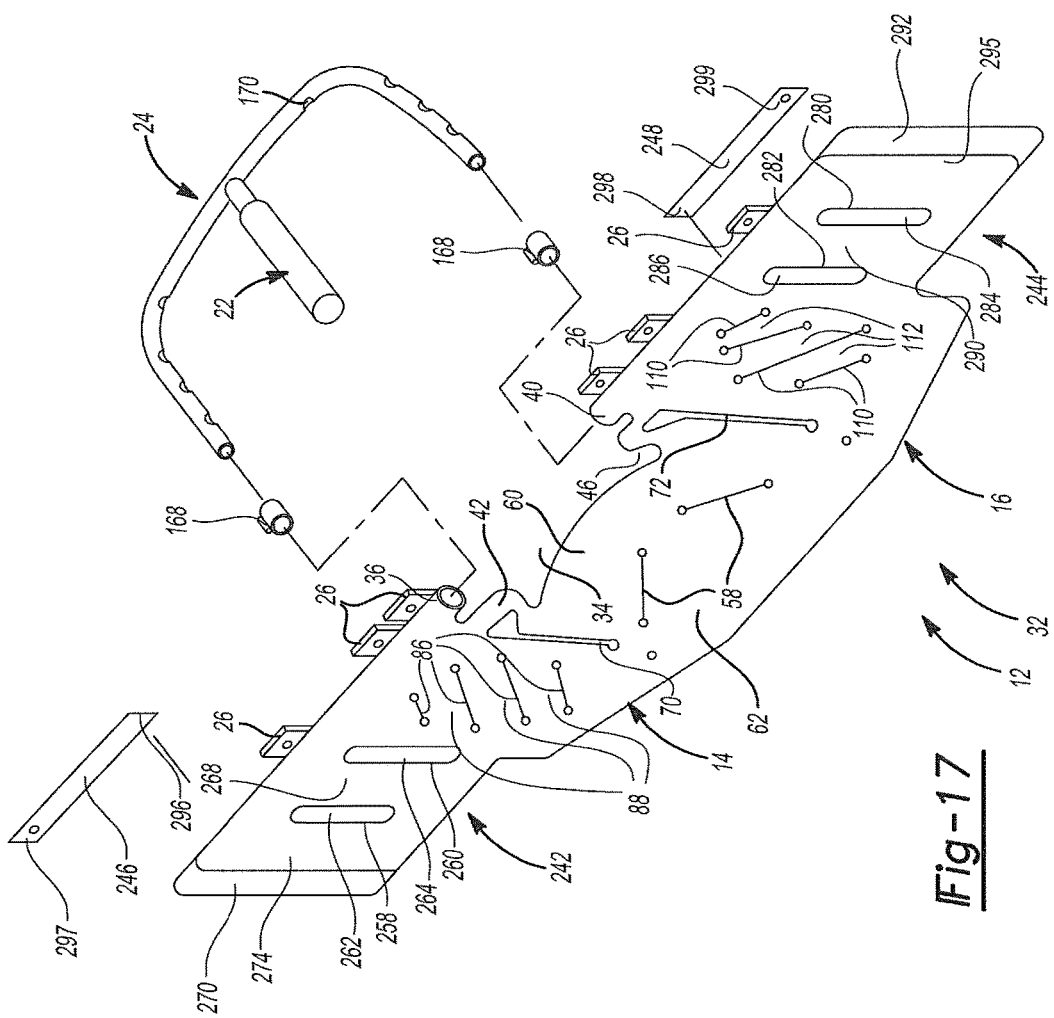
FIG. 17 is an exploded perspective view of the airbag assembly of FIG. 16.

The vertical seam 114 in the right side cushion portion 16 and the outer vertical seam 282 in the right rear cushion portion 244 define a first inflated region 288 (FIG. 16) therebetween. The inner and outer vertical seams 280 and 282 in the right rear cushion portion 244 define a second inflated region 290 therebetween. An end 292 of the right rear cushion portion 244 is sewn to the uninflated region 252 of the left side cushion portion 14 using stitches 294 (FIG. 16). The sewn end 292 of the right rear cushion portion 244 and the inner vertical seam 280 of the right rear cushion portion 244 define a third inflated region 295 therebetween.

The first, second, and third inflated regions 288, 290, and 295 are distinct air-filled chambers that collectively form a large inflated structure similar to that shown in FIG. 19 and including the right rear cushion portion 244. As shown in FIG. 18, the right rear cushion portion 244 is positioned adjacent to the right side of the head restraint 113 and above the seatback 115. Thus, the large inflated structure including the right rear cushion portion 244 provides cushioning and/or restraint for the head 125 of the occupant 27 on the right side of the head restraint 113.

The first tether 246 has a first end 296 (FIG. 17) sewn to the outer uninflated region 264 of the left rear cushion portion 262 and a second end 297 joined to a first structural component of the vehicle such as the vehicle roof or a pillar. The second tether 248 has a first end 298 sewn to the outer uninflated region 286 of the right rear cushion portion 244 and a second end 299 joined to a second structural component of the vehicle such as the vehicle roof or a pillar. The first and second structural components can also be a structural component disposed inboard of the left rear cushion portion 242 and/or the right rear cushion portion 244.

Figure 20:
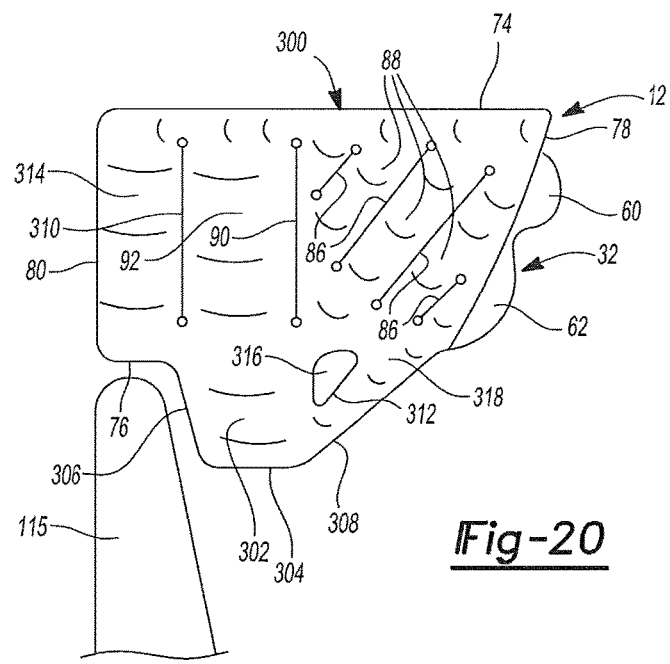
FIG. 20 is a side view of the airbag assembly of FIG. 16.

Referring now to FIG. 20, the airbag assembly 10, 200, or 240 may include a left side cushion portion 300 in place of the left side cushion portion 14. The left side cushion portion 300 is similar to the left side cushion portion 14 except that the left side cushion portion 300 includes a lower lobe 302 for cushioning and/or restraining the torso 123 of the occupant 27. The lower lobe 302 extends below the lower horizontal edge 76 of the left side cushion portion 300. The lower lobe 302 has a lower horizontal edge 304, a first angled edge 306, and a second angled edge 308. The first angled edge 306 extends from the lower horizontal edge 76 to the lower horizontal edge 304. The second angled edge 308 extends from the lower horizontal edge 304 to the front edge 78 of the left side cushion portion 300.

The left side cushion portion 300 also differs from the left side cushion portion 14 in that the left side cushion portion 300 includes a second vertical seam 310 disposed rearward of the vertical seam 90 and a polygonal seam 312 disposed below the elongated inflated regions 88. The second vertical seam 310 and the rear edge 80 of the left side cushion portion 300 define a vertical inflated region 314 disposed therebetween. The polygonal seam 312 defines an outer perimeter of an uninflated region 316 having the shape of a triangle with rounded corners. In addition, the polygonal seam 312 and the second angled edge 308 of the lower lobe 302 define an elongated inflated region 318 therebetween.

Figures 21, 22:
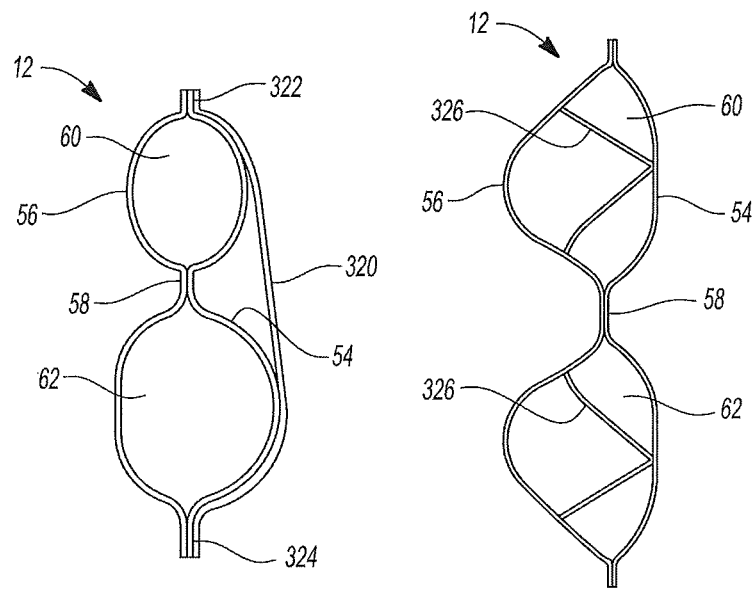
FIG. 21 is a cross-sectional view of the airbag assembly of FIG. 16 taken along a line 21-21 shown in FIG. 16.
FIG. 22 is a cross-sectional view similar to the cross-sectional view shown FIG. 21 and illustrating another example of an airbag assembly according to the present disclosure.

Referring now to FIG. 21, a variation of the forward cushion portion 12 is shown. As discussed above, the seams 58 of the forward cushion portion 12 join the inner and outer panel portions 54 and 56 to one another and define a boundary between the upper and lower portions 60 and 62. In FIG. 21, the forward cushion portion 12 further includes a panel 320 attached (e.g., sewn) to an upper edge 322 of the forward cushion portion 12 and a lower edge 324 of the forward cushion portion 12. The panel 320 extends over the upper and lower portions (or lobes) 60 and 62 to provide a flat surface that faces the occupant 27.

Referring now to FIG. 22, another variation of the forward cushion portion 12 is shown. In FIG. 22, the forward cushion portion 12 further includes a tether 326 disposed within each of the upper and lower portions (or lobes) 60 and 62. The tethers 326 join the inner and outer panel portions 54 and 56 to one another and flatten the inner panel portion 54. The tethers 326 may be woven into or sewn to the inner and outer panel portions 54 and 56.

Figure 24:
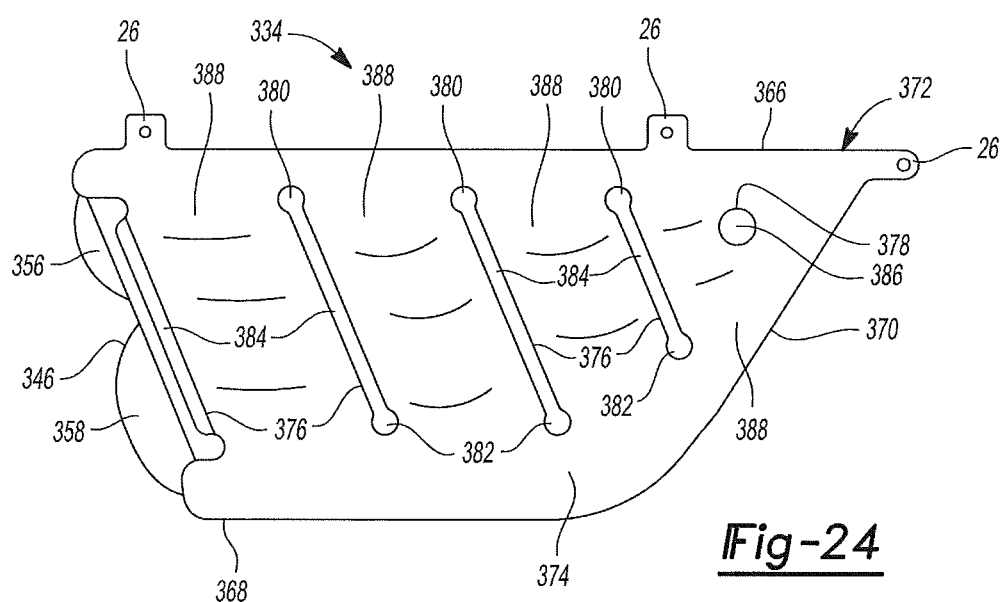
FIG. 24 is a side view of the airbag assembly of FIG. 23.

Referring now to FIGS. 23 and 24, an airbag assembly 330 includes a forward cushion portion 332, a left side cushion portion 334, a right side cushion portion 336, and a plurality of the mounting tabs 26. The forward cushion portion 332 has an upper horizontal edge 338 and a pair of lower edges 340 that are angled downward toward a centerline 342 of the forward cushion portion 332. The forward cushion portion 332 includes an inner panel portion 344, an outer panel portion 346, a pair of horizontal seams 348, and a plurality of angled seams 350.

Each of the horizontal and angled seams 348 and 350 is formed by stitching the inner and outer panel portions 344 and 346 to one another, by fibers of the inner and outer panel portions 344 and 346 woven together, and/or by a tether (e.g., a fabric strip) extending between and woven or otherwise attached to the inner and outer panel portions 344 and 346. If the seams 348, 350 are formed by stitching or woven material, the inner and outer panel portions 344 and 346 may contact one another at the seams 348, 350. In this regard, the stitching or woven material may be referred to as a zero-length tether since the length of the stitching or woven material extending between the inner and outer panel portions 344 and 346 at the seams 348, 350 may be approximately zero.

Each of the horizontal and angled seams 348 and 350 joins the inner and outer panel portions 344 and 346 to one another. The horizontal seams 348 define horizontal uninflated regions 352, and the angled seams 350 define angled uninflated regions 354. Each of the horizontal and angled uninflated regions 352 and 354 has an oval shape with bulbous outer ends. The horizontal and angled uninflated regions 352 and 354 can be pockets between the inner and outer panel portions 344 and 346 that are not filled with air, or openings in the inner and outer panel portions 344 and 346.

The angled seams 350 define a pair of angled boundaries between an upper region 356 of the forward cushion portion 332 and a lower region 358 of the forward cushion portion 332. The angled boundaries formed by the angled seams 350 are angled upward toward the centerline 342 of the forward cushion portion 332, thus mirroring the angled lower edges 340 of the forward cushion portion 332. As a result, the lower region 358 of the forward cushion portion 332 has a diamond shape.

The lower region 358 has a first cross-sectional area in a vertical plane at the left and right sides of the forward cushion portion 332 and a second cross-sectional area at the centerline 342 of the forward cushion portion 332. The second cross-sectional area is greater than the first cross-sectional area. In addition, the first and second cross-sectional areas are respectively less than and greater than the cross-sectional area of the lower region 358 in any other vertical plane. Thus, the lower region 358 of the forward cushion portion 332 is stiffest in the middle and can transfer occupant loads to the left and right side cushion portions 334 and 336.

The horizontal seams 348 define a pair of horizontal boundaries between an upper portion 360 of the upper region 356 and a lower portion 362 of the upper region 356. The forward cushion portion 332 further includes a fabric fill tube 364 projecting the upper edge 338 of the forward cushion portion 332. The fabric fill tube 364 is directly connected to the inflator 22 and delivers air from the inflator 22 to the upper region 356 of the forward cushion portion 332. Directly connecting the fabric fill tube 364 to the inflator 22 avoids the need for the rigid fill tube 24. The upper and lower portions 360 and 362 also act as fill tubes by delivering air from the fabric fill tube 364 to the left and right side cushion portions 334 and 336, respectively.

Each of the left and right side cushion portions 334 and 336 has an upper edge 366, a lower edge 368, and an angled edge 370 extending between the upper and lower edges 366 and 368. Each of the left and right side cushion portions 334 and 336 includes an inner panel portion 372, outer panel portion 374, a plurality of angled seams 376, and a circular seam 378. Each of the angled and circular seams 376 and 378 joins the inner and outer panel portions 372 and 374 to one another.

Each of the seams 376, 378 is formed by stitching the inner and outer panel portions 372 and 374 to one another, by fibers of the inner and outer panel portions 372 and 374 woven together, and/or by a tether (e.g., a fabric strip) extending between and woven or otherwise attached to the inner and outer panel portions 372 and 374. If the seams 376, 378 are formed by stitching or woven material, the inner and outer panel portions 372 and 374 may contact one another at the seams 376, 378. In this regard, the stitching or woven material may be referred to as a zero-length tether since the length of the stitching or woven material extending between the inner and outer panel portions 372 and 374 at the seams 376, 378 may be approximately zero.

The angled seams 376 are oriented at an angle other than 90 degrees with respect to each of the upper and lower edges 366 and 368. Each of the angled seams 376 has an upper end 380 and a lower end 382 that is disposed rearward of the upper end 380. In this regard, each of the angled seams 376 is angled rearward by a first angle (e.g., 15 degrees) in a direction from the upper end 380 to the lower end 382.

Each of the angled seams 376 defines an angled uninflated region 384, and the circular seam 378 defines circular uninflated regions 386. Each of the angled uninflated regions 384 has an oval shape with bulbous outer ends. The angled and circular uninflated regions 384 and 386 can be pockets between the inner and outer panel portions 372 and 374 that are not filled with air, or openings in the inner and outer panel portions 372 and 374. The angled seams 376 also define a plurality of elongated or angled inflated regions 388 therebetween. Each of the angled inflated regions 388 has a tubular shape.

The angled orientation of the uninflated and inflated regions 384 and 388 cause the left and right side cushion portions 334 and 336 to pull the lower region 358 of the forward cushion portion 332 in a rearward direction toward the occupant 27. In turn, the forward cushion portion 332 rotates in the direction 119 (FIGS. 3-5) so that the inner panel portion 344 of the forward cushion portion 332 is generally parallel with the torso 123 of each occupant 27 when the occupant 27 contacts the forward cushion portion 332. This allows the head 125 of each occupant 27 to rotate forward with the torso 123 until the torso 123 and the head 125 contact the inner panel portion 344 of the forward cushion portion 332 at about the same time, which reduces the forces and moment on the neck 127 of each occupant 27.

Figure 26:
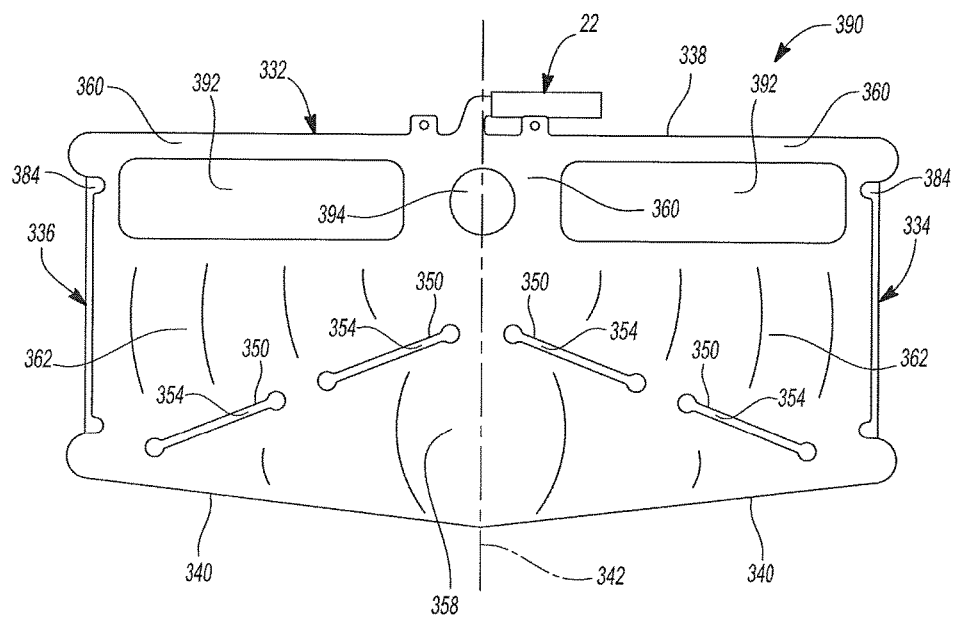
FIG. 26 is a front view of the airbag assembly of FIG. 25.
Figure 27:
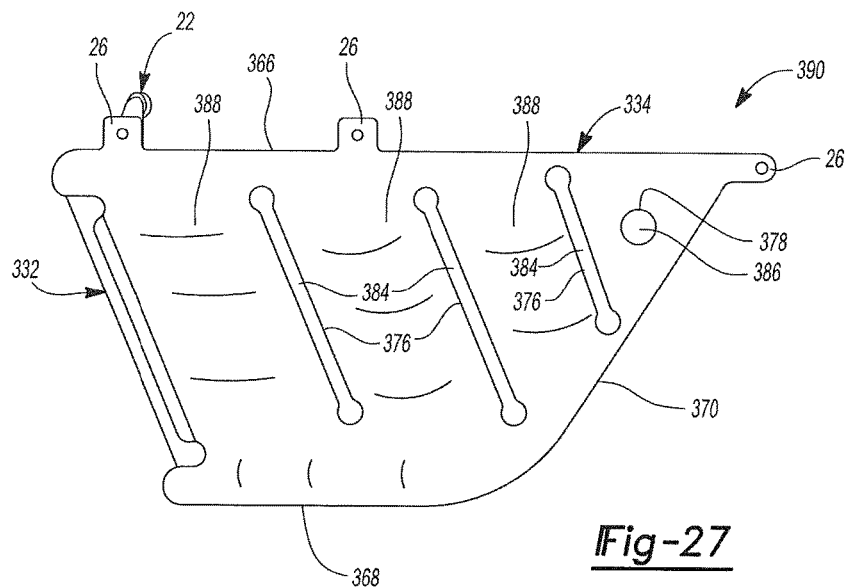
FIG. 27 is a side view of the airbag assembly of FIG. 25.

Referring now to FIGS. 25-27, an airbag assembly 390 is similar to the airbag assembly 330 except that the airbag assembly 390 is configured to provide cushioning for two of the occupants 27. In this regard, the airbag assembly 390 may have a width (i.e., a cross-vehicle or left-right dimension) that is approximately twice the width of the airbag assembly 330. In addition, the airbag assembly 390 defines a pair of openings 392 in place of the uninflated regions 352. Each of the openings 392 has a rectangular shape with rounded corners, and each of the openings 392 may have a width that is approximately equal to the width of the seatback 115.

The airbag assembly 390 further defines an opening 394 located along the centerline 342 of the forward cushion portion 332 and disposed between the openings 392 in a cross-vehicle or left-right direction. The opening 394 has a circular shape. The openings 392, 394 allow the lower portion 362 of the upper region 356 of the forward cushion portion 332 to move in a forward direction when loaded by the head 125 of the occupant 27. As a result, the forward cushion portion 332 allows the head 125 of each occupant 27 to rotate forward with the torso 123 when the torso 123 and the head 125 contact the inner panel portion 344 of the forward cushion portion 332.

The angled orientation of the uninflated and inflated regions 384 and 388 cause the left and right side cushion portions 334 and 336 to pull the lower region 358 of the forward cushion portion 332 in a rearward direction toward the occupant 27. In turn, the forward cushion portion 332 rotates in the direction 119 (FIGS. 3-5) so that the inner panel portion 344 of the forward cushion portion 332 is generally parallel with the torso 123 of each occupant 27 when the occupant 27 contacts the forward cushion portion 332. This assists the head 125 of each occupant 27 to rotate forward with the torso 123 after the torso 123 and the head 125 contact the inner panel portion 344 of the forward cushion portion 332, which reduces the forces and moment on the neck 127 of each occupant 27.

Figure 28:
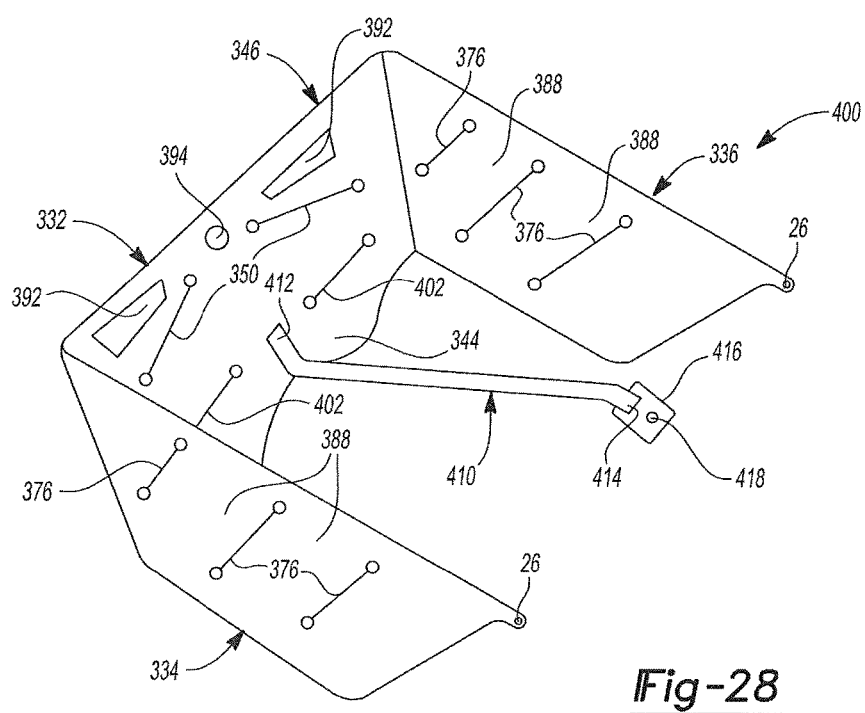
FIG. 28 is a perspective view of another example of an airbag assembly according to the present disclosure, with an airbag cushion of the airbag assembly shown inflated.
Figure 29:
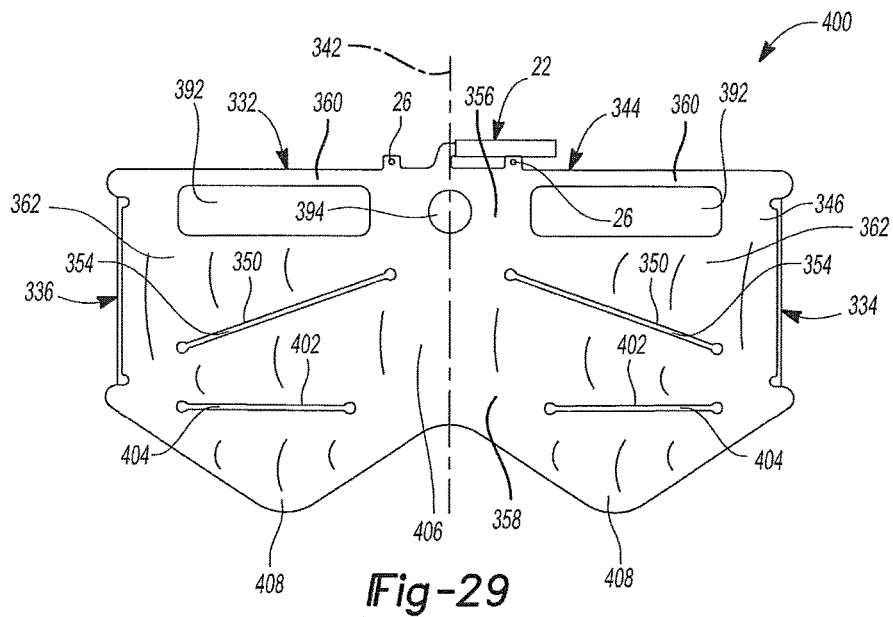
FIG. 29 is a front view of the airbag assembly of FIG. 28.

Referring now to FIGS. 28 and 29, an airbag assembly 400 is similar to the airbag assembly 390 except that the forward cushion portion 332 of the airbag assembly 400 includes only two of the angled seams 350 rather than four, and the length of the angled seams 350 is greater. In addition, the forward cushion portion 332 of the airbag assembly 400 further includes a pair of horizontal seams 402 disposed below the angled seams 350. Further, the lower edge of the forward cushion portion 332 has a different shape.

Each of the horizontal seams 402 is formed by stitching the inner and outer panel portions 344 and 346 to one another, by fibers of the inner and outer panel portions 344 and 346 woven together, and/or by a tether (e.g., a fabric strip) extending between and woven or otherwise attached to the inner and outer panel portions 344 and 346. If the seams 402 are formed by stitching or woven material, the inner and outer panel portions 344 and 346 may contact one another at the seams 402. In this regard, the stitching or woven material may be referred to as a zero-length tether since the length of the stitching or woven material extending between the inner and outer panel portions 344 and 346 at the seams 402 may be approximately zero.

Each of the horizontal seams 402 joins the inner and outer panel portions 344 and 346 to one another. The horizontal seams 402 define horizontal uninflated regions 404. Each of the horizontal uninflated regions 404 has an oval shape with bulbous outer ends. The horizontal uninflated regions 404 can be pockets between the inner and outer panel portions 344 and 346 that are not filled with air, or openings in the inner and outer panel portions 344 and 346.

Each of the horizontal seams 402 defines a boundary between an upper portion 406 of the lower region 358 of the forward cushion portion 332 and a lower portion 408 of the lower region 358. The airbag assembly 400 is similar to the airbag assembly 390 in that each of the angled seams 350 defines a boundary between the upper region 356 of the forward cushion portion 332 and the lower region 358 of the forward cushion portion 332. The lower portions 408 of the lower region 358, and possibly the upper portion 406 of the lower region 358, provide cushioning for the heads 125 of the shorter height occupants 27-2 (FIG. 4). Each of the upper and lower portions 406 and 408 of the lower region 358 and the lower portions 362 of the upper region 356 has a triangular shape.

The airbag assembly 400 further includes a tether 410 attaching the forward cushion portion 332 to a structural component of the vehicle (e.g., roof, floor panel) to stabilize the airbag assembly 400 at the centerline 342 between the occupants 27. The tether 410 has a first end 412 attached (e.g., sewn) to at least the inner panel portion 344 of the forward cushion portion 332 at the centerline 342 thereof, and a second end 414 attached to the vehicle structural component. In the example shown, the second end 414 of the tether 410 is secured to a bracket 416 defining a hole 418 for receiving a fastener to attach the tether 410 to the vehicle structural component.

Figure 30:
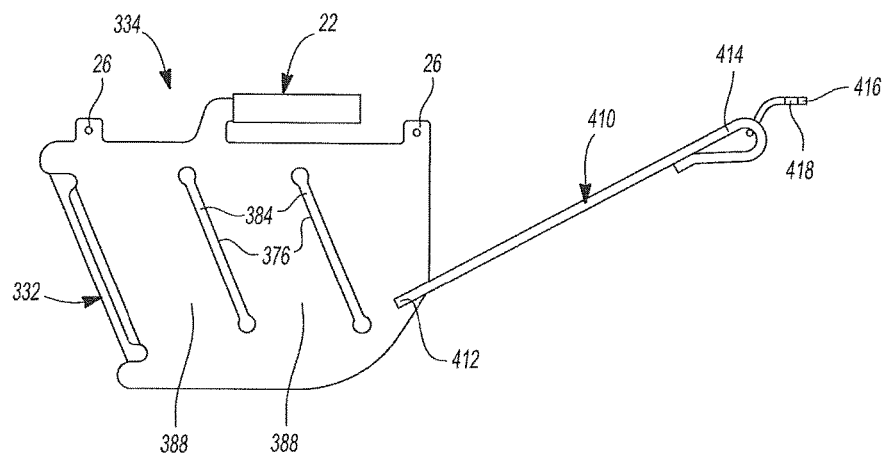
FIG. 30 is a side view of another airbag assembly according to the present disclosure, with an airbag cushion of the airbag assembly shown inflated.

In various implementations, the inflator 22 and/or the tether 410 may be attached to the left or right side cushion portion 334 or 336 instead of the forward cushion portion 332. For example, the inflator 22 and the tether 410 may be attached to the left side cushion portion 334 as shown in FIG. 30.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "front," "forward," "rear," "rearward," "inner," "outer," "behind," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. In another example, relative terms such as "front," "forward," "rear," "rearward," and "behind" as used herein are relative to the direction that an occupant of a vehicle is facing. Thus, if an occupant is facing the rear end of a vehicle, the front end of an airbag assembly according to the present disclosure is disposed further away from the front end of the vehicle than the rear end of the airbag assembly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An airbag assembly comprising:
   a forward cushion portion configured to be disposed in front of an occupant of a vehicle, the forward cushion portion including a lower region;
   a left side cushion portion connected to and in fluid communication with the forward cushion portion, configured to be disposed on a left side of the occupant, and configured to be mounted to a roof of the vehicle; and
   a right side cushion portion connected to and in fluid communication with the forward cushion portion, configured to be disposed on a right side of the occupant, and configured to be mounted to the vehicle roof, wherein the left side cushion portion, the right side cushion portion, and the forward cushion portion define at least one opening disposed above the lower region of the forward cushion portion and between the left and right side cushion portions, the at least one opening allowing at least a portion of the lower region to move forward relative to the left and right side cushion portions.

2. The airbag assembly of claim 1 wherein:
   the forward cushion portion further includes a left upper region configured to be mounted to the vehicle roof and a right upper region configured to be mounted to the vehicle roof; and
   the lower region of the forward cushion portion is disposed below and in fluid communication with the left and right upper regions.

3. The airbag assembly of claim 2 wherein:
   each of the left and right upper regions of the forward cushion portion includes a first fill tube configured to provide fluid communication between an inflator and one of the left and right side cushion portions, and a tether connecting the first fill tube to the lower region of the forward cushion portion; and
   the tethers of the left and right upper regions divide the at least one opening into a first opening, a second opening, and a third opening, the first opening being disposed between the tethers, the second opening separating the tether of the left upper region from the left side cushion portion, the third opening separating the tether of the right upper region from the right side cushion portion.

4. The airbag assembly of claim 3 wherein:
   the lower region includes a lower portion that is attached to the left and right side cushion portions and an upper portion that is separated from the left and right side cushion portions by the second and third openings;
   the lower portion of the lower region has a first cross-sectional area in a first vertical plane adjacent to the left and right side cushion portions and a second cross-sectional area in a second vertical plane at or near a midpoint of the forward cushion portion in a direction extending between the left and right side cushion portions; and
   the second cross-sectional area is greater than the first cross-sectional area.

5. The airbag assembly of claim 3 wherein the tether is a second fill tube that places the first fill tube in fluid communication with the lower region of the forward cushion portion.

6. The airbag assembly of claim 3 wherein the tether has a length that is greater than a distance between the first fill tube and the lower region of the forward cushion portion.

7. The airbag assembly of claim 1 further comprising a rigid fill tube configured to deliver gas from an inflator to each of the forward cushion portion, the left side cushion portion, and the right side cushion portion, wherein the rigid fill tube includes a straight segment extending through the forward cushion portion and a pair of curved segments that each extends from the straight segment to one of the left and right side cushion portions through an angle greater than 45 degrees.

8. The airbag assembly of claim 1 further comprising at least one of:
   a left rear cushion portion in fluid communication with the left side cushion portion, configured to be disposed rearward of the occupant, and configured to be mounted to the vehicle roof; and
   a right rear cushion portion in fluid communication with the right side cushion portion, configured to be disposed rearward of the occupant, and configured to be mounted to the vehicle roof.

9. The airbag assembly of claim 8 wherein the at least one of the left and right rear cushion portions is configured to be disposed adjacent to one side of a head restraint for the occupant without being disposed behind the head restraint.

10. The airbag assembly of claim 8 wherein the at least one of the left and right rear cushion portions is configured to be disposed behind a head restraint for the occupant.

11. An airbag assembly comprising:
    a forward cushion portion configured to be disposed in front of an occupant of a vehicle; and
    a first side cushion portion in fluid communication with the forward cushion portion, configured to be disposed on a first side of the occupant, and configured to be mounted to a roof of the vehicle, the first side cushion portion having an upper horizontal edge, a lower horizontal edge, a front edge, and a rear edge, the first side cushion portion including an inner panel portion, an outer panel portion, and a plurality of seams joining the inner and outer panel portions to one another and defining a plurality of elongated inflated regions, wherein the plurality of seams are oriented at an angle between 30 degrees and 60 degrees with respect to the upper horizontal edge.

12. The airbag assembly of claim 11 wherein the first side cushion portion further includes a first inflated region disposed rearward of the plurality of elongated inflated regions, each of the plurality of elongated inflated regions having a first width between the inner and outer panel portions, the first inflated region having a second width between the inner and outer panel portions that is greater than the first width.

13. The airbag assembly of claim 11 wherein the forward cushion portion includes an inner panel portion, an outer panel portion, and at least one seam joining the inner and outer panel portions of the forward cushion portion to one another and defining at least one boundary between at least two lobes of the forward cushion portion.

14. The airbag assembly of claim 13 wherein the forward cushion portion further includes a panel attached to upper and lower edges of the forward cushion portion and extending over the at least two lobes to provide a flat surface configured to face the occupant.

15. The airbag assembly of claim 13 wherein the forward cushion portion further includes a tether disposed within at least one of the at least two lobes, joining the inner and outer panel portions to one another, and flattening the inner panel portion.

16. An airbag assembly comprising:
a side cushion portion configured to be disposed on one side of an occupant of a vehicle, the side cushion portion including an inner panel portion, an outer panel portion, and a first seam joining the inner and outer panel portions to one another and defining a boundary between a forward inflated region of the side cushion portion and a rearward inflated region of the side cushion portion, wherein the forward inflated region is configured to be disposed at least partially forward of the occupant and the rearward inflated region is configured to be disposed at least partially rearward of the occupant, the forward inflated region having a first width between the inner and outer panel portions, the rearward inflated region having a second width between the inner and outer panel portions that is greater than the first width; and
a mounting tab connected to the side cushion portion and configured to be attached to a roof of the vehicle.

17. The airbag assembly of claim 16 wherein the second width is at least two times greater than the first width.

18. The airbag assembly of claim 16 wherein the rearward inflated region is aligned with at least one of a seatback for the occupant and a head restraint for the occupant in a fore-aft direction of the vehicle.

19. The airbag assembly of claim 16 wherein the rearward inflated region forms at least one of multiple air-filled chambers disposed above a seatback for the occupant and adjacent to one side of a head restraint for the occupant.

20. The airbag assembly of claim 19 further comprising a rear cushion portion in fluid communication with the side cushion portion, the rear cushion portion including an inner panel portion, an outer panel portion, second and third seams joining the inner and outer panel portions to one another, and an end that is joined to the side cushion portion at the first seam, the first and second seams defining a first one of the air-filled chambers therebetween, the second and third seams defining a second one of the air-filled chambers therebetween, the third seam and the end of the rear cushion portion defining a third one of the air-filled chambers therebetween.

* * * * *